(12) United States Patent
Lee et al.

(10) Patent No.: US 11,627,250 B2
(45) Date of Patent: Apr. 11, 2023

(54) IMAGE COMPRESSION METHOD, ENCODER, AND CAMERA MODULE INCLUDING THE ENCODER

(71) Applicant: SAMSUNG ELECTRONICS CO., LTD., Suwon-si (KR)

(72) Inventors: Wonseok Lee, Suwon-si (KR); Seongwook Song, Seoul (KR); Hyukjae Jang, Suwon-si (KR); Sungho Jun, Hwaseong-si (KR); Yunseok Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 236 days.

(21) Appl. No.: 17/183,547

(22) Filed: Feb. 24, 2021

(65) Prior Publication Data
US 2021/0344834 A1 Nov. 4, 2021

(30) Foreign Application Priority Data

Apr. 29, 2020 (KR) .................. 10-2020-0052891

(51) Int. Cl.
H04N 5/232 (2006.01)
H04N 19/105 (2014.01)
H04N 19/182 (2014.01)
H04N 19/186 (2014.01)
G06V 10/56 (2022.01)

(52) U.S. Cl.
CPC ......... H04N 5/23229 (2013.01); G06V 10/56 (2022.01); H04N 19/105 (2014.11); H04N 19/182 (2014.11); H04N 19/186 (2014.11)

(58) Field of Classification Search
CPC ............ H04N 5/23229; H04N 19/105; H04N 19/182; H04N 19/186; H04N 9/04557; H04N 19/14; H04N 19/42; H04N 5/374; H04N 19/117; H04N 9/8042; H04N 5/2253; H04N 5/2257; G06V 10/56
See application file for complete search history.

(56) References Cited

U.S. PATENT DOCUMENTS 6,295,624 B1 * 9/2001 Gillard ................. H04N 19/122
375/E7.06
6,614,483 B1 9/2003 Lee et al.
6,683,987 B1 * 1/2004 Sugahara ............. H04N 19/156
375/E7.199

(Continued)

FOREIGN PATENT DOCUMENTS

JP 4892869 3/2012
JP 2012231377 11/2012

(Continued)

Primary Examiner — Hung H Lam
(74) Attorney, Agent, or Firm — F. Chau & Associates, LLC

(57) ABSTRACT

An image compression method to compress image data generated through a pixel array includes categorizing image data corresponding to a plurality of sub-pixels arranged adjacent to each other and generating first color information for a first color pixel; determining a reference value as a criterion for compressing the image data based on pixel values of the sub-pixels; comparing the pixel values of the sub-pixels with the reference value; and outputting results of the comparisons and the reference value.

20 Claims, 25 Drawing Sheets

(56) References Cited

U.S. PATENT DOCUMENTS

| | | | | |
|---|---|---|---|---|
| 6,873,657 | B2 * | 3/2005 | Yang | H04N 19/85 |
| | | | | 375/E7.189 |
| 7,609,763 | B2 * | 10/2009 | Mukerjee | H04N 19/577 |
| | | | | 375/240.16 |
| 8,045,815 | B2 | 10/2011 | Matsuoka et al. | |
| 2012/0120043 | A1 * | 5/2012 | Cho | H04N 19/15 |
| | | | | 382/232 |
| 2017/0070555 | A1 * | 3/2017 | Frello | H04N 19/50 |
| 2019/0373189 | A1 | 12/2019 | Lee | |

FOREIGN PATENT DOCUMENTS

| | | |
|---|---|---|
| JP | 2013093745 | 5/2013 |
| JP | 2017005456 | 1/2017 |
| JP | 2018046324 | 3/2018 |

\* cited by examiner

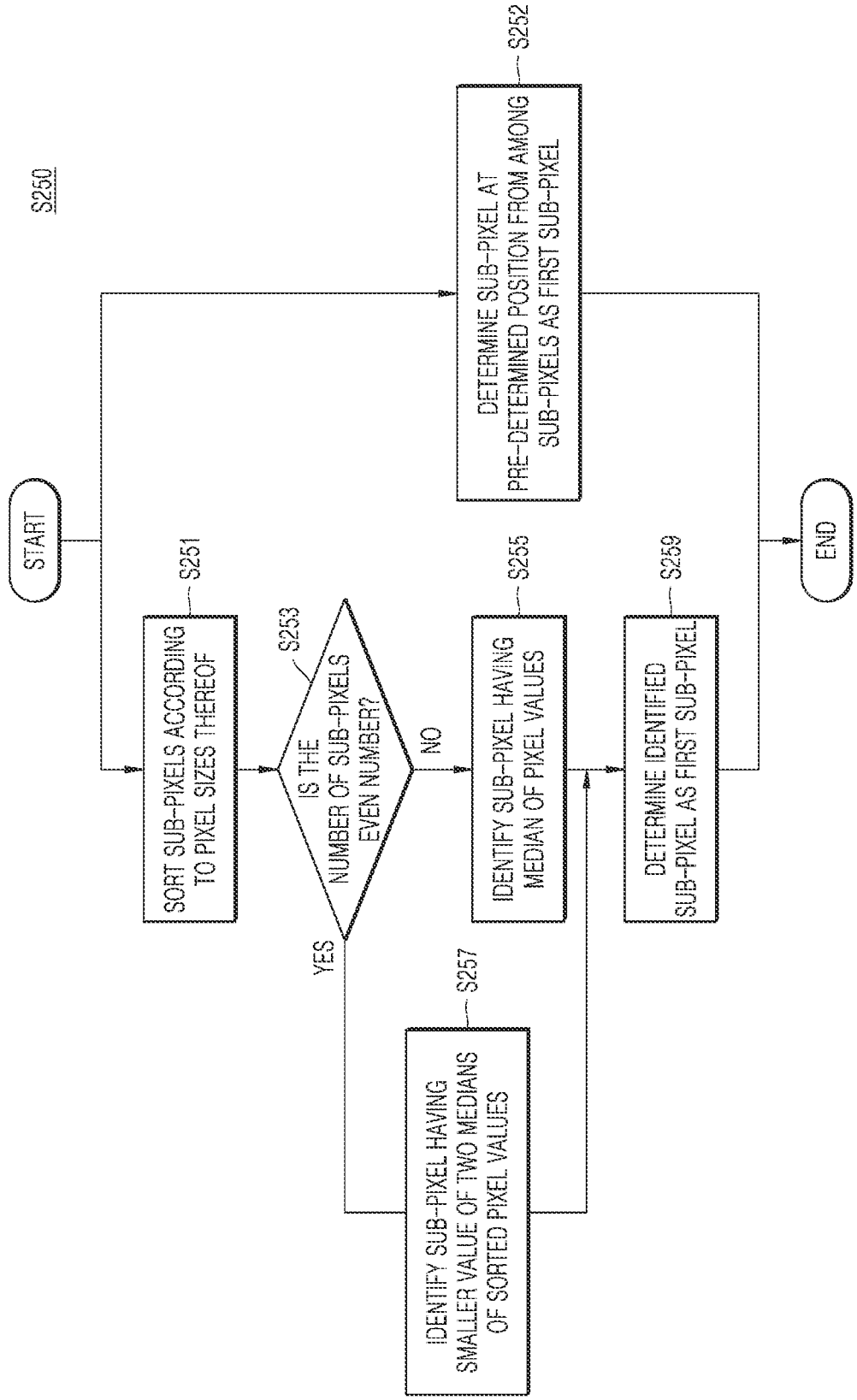

IMAGE COMPRESSION METHOD, ENCODER, AND CAMERA MODULE INCLUDING THE ENCODER

CROSS-REFERENCE TO RELATED APPLICATION

This application claims priority under 35 U.S.C. § 119 to Korean Patent Application No. 10-2020-0052891, filed on Apr. 29, 2020, in the Korean Intellectual Property Office, the disclosure of which is incorporated by reference herein in its entirety.

FIELD

The inventive concept relates to image compression, and more particularly, to an image compression method, an encoder for compressing an image, and a camera module including the encoder for compressing an image.

DISCUSSION OF RELATED ART

As dual cameras are mounted on various electronic devices, or the number of images that may be captured per second increases, and the demand for high-resolution images increases, the size of image data stored in electronic devices is increasing.

To downsize the image data, high spatial similarity may be utilized to compress data based on a difference between a target pixel to be compressed and a reference pixel.

SUMMARY

The present disclosure provides an image compression method, an encoder, and an image capture device for compressing image data with reference to a pixel with high spatial similarity.

According to an exemplary embodiment of the present disclosure, an image compression method is provided to compress image data generated through a pixel array, the method including categorizing image data corresponding to a plurality of sub-pixels arranged adjacent to each other and generating first color information into a first color pixel; determining a reference value that is a criterion for compressing the image data based on pixel values of the sub-pixels; comparing the pixel values of the sub-pixels with the reference value; and outputting results of the comparisons and the reference value.

According to an exemplary embodiment of the present disclosure, an encoder is configured to categorize image data corresponding to a plurality of sub-pixels arranged adjacent to one other and generating first color information into a first color pixel; determine a reference value that is a criterion for compressing the image data based on pixel values of the sub-pixels; compare the pixel values of the sub-pixels with the reference value; and output results of the comparisons and the reference value.

According to an exemplary embodiment of the present disclosure, an image sensor is provided including a pixel array having a plurality of pixels that are arranged in a matrix shape and respectively generate a pixel signal, the image sensor configured to convert light into an electrical signal by using photoelectric conversion elements and output image data; and an encoder configured to output a bit stream generated by compressing the image data, wherein the encoder categorizes a plurality of sub-pixels adjacent to each other and generating first color information into a first color pixel, determines a reference value that is a criterion for compressing the image data based on pixel values of the sub-pixels, compares the pixel values of the sub-pixels with the reference value, and outputs results of the comparisons and the reference value.

BRIEF DESCRIPTION OF THE DRAWINGS

Embodiments of the present disclosure will be more clearly understood from the following detailed description when taken in conjunction with the accompanying drawings, in which:

FIGS. 10 and 11 are flowchart diagrams of an image compression method according to an exemplary embodiment;

DETAILED DESCRIPTION

In the present disclosure, the term 'pixel' or 'sub-pixel' refers to a physical area where a light sensing element for sensing an object is located and, in a representative sense, information about a portion of a sensed object corresponding to an electric signal generated from a light sensing element that sensed a portion of the object.

Figure 1:
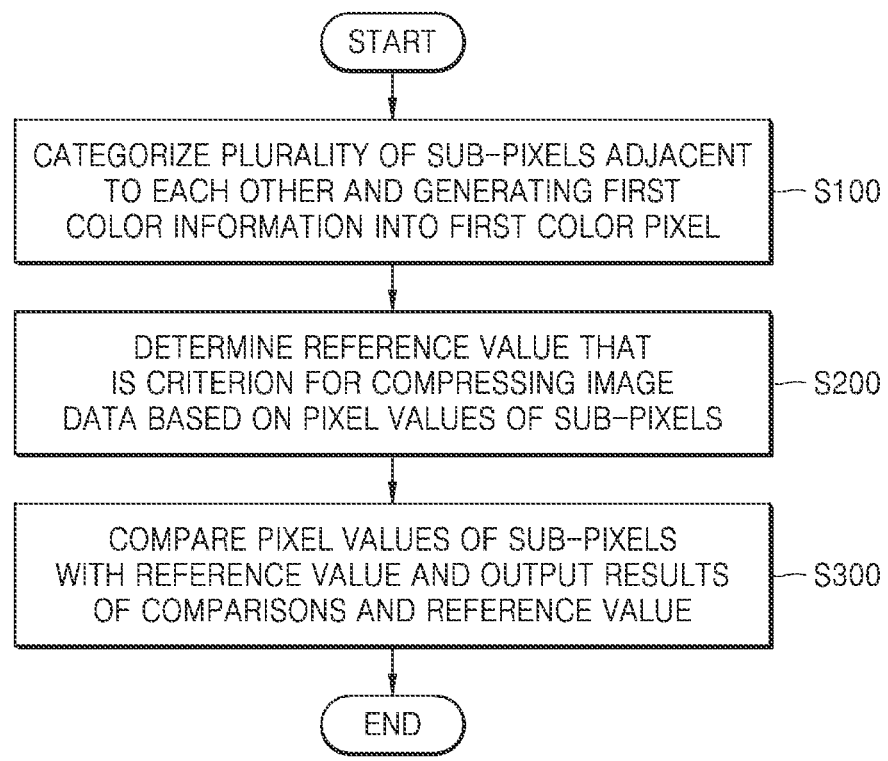
FIG. 1 is a flowchart diagram of an image compression method according to an exemplary embodiment.

FIG. 1 illustrates an image compression method according to an exemplary embodiment of the present disclosure.

Due to increases in the degree of integration and processing speed of a semiconductor device, the number of images that may be captured per second may also increase. The size of image data stored and processed in an electronic device is gradually increasing. Therefore, a technique for compressing image data is provided to effectively process the image data.

The greater the number of light sensing elements that convert light signals into electrical signals, the easier it may be to generate high-resolution images. As the degree of integration of light sensing elements increases, the physical separations between the light sensing elements may be narrowed. As a result, noise such as crosstalk may occur, thereby deteriorating image quality.

At low luminance, it is relatively difficult to input sufficient optical signals to light sensing elements, and insufficient optical signals may become a hindrance for generating a high-resolution image. To generate a high-resolution image even at low luminance, color pixels sharing the same color may each be divided into a plurality of sub-pixels, and thus, a plurality of sub-pixels may be used to express a single-color pixel. When all of electrical signals generated by a plurality of sub-pixels are combined, a sufficient amount of light may be collected.

For effective compression of image data, high compression efficiency and small data loss are desired. As a method of compressing an image, a target pixel to be compressed and a reference pixel from among candidate pixels adjacent to the target pixel may be determined, and image data may be compressed based on a pixel difference value between the target pixel and the reference pixel. The method of compressing an image based on a pixel difference value may be performed under the prerequisite that a target pixel and a reference pixel are sensed at a spatially adjacent distance from each other. In other words, the method of compressing an image based on a pixel difference value may utilize the physical characteristic that a particular portion of an object is sensed by at least one light sensing element located at a corresponding portion of an image sensor. Therefore, to reduce data loss, high spatial similarity between pixels corresponding to light sensing elements for sensing an object is utilized.

The above-stated method of compressing an image may also be applied to a case of compressing a Bayer image in which color pixels including a plurality of sub-pixels arranged to pass through the same color filter are arranged according to a particular color pattern. In an exemplary embodiment, a Bayer pattern may be a pattern known in the art, in which green, red, blue, and another green are arranged in a matrix form such as in the left to right and top to bottom order stated. To refer to pixel information regarding the same color pixel, a target sub-pixel may refer to pixel information about another color pixel across other color pixels adjacent to the target sub-pixel. For example, when a target sub-pixel to be compressed passes through a green color filter (that is, the target sub-pixel contains information about green color), candidate sub-pixels to be referred to for compressing the target sub-pixel may be green pixels located around the target sub-pixel. As sub-pixels are arranged in the Bayer pattern, the target sub-pixel is surrounded by red pixels and/or blue pixels, and thus, to determine candidate sub-pixels and a reference sub-pixel, pixel information about another green pixel beyond one red pixel and/or one blue pixel may be referred to. When crossing other color pixels, the spatial similarity between the target sub-pixel and the reference sub-pixel may be relatively low.

An image compression method according to the inventive concept may include operations S100 to S300 below.

In operation S100, a plurality of sub-pixels, that are arranged adjacent to each other and generate pixel values or pixel signals including substantially the same color information, may be categorized into the same color pixels. Image data may include information from a plurality of color pixels arranged in various color patterns or combinations of color regions. In an exemplary embodiment, a color pixel may include a red pixel, a green pixel, or a blue pixel, and pixel values output from sub-pixels included in one color pixel may all include the same color information. Each of the color pixels may include a plurality of sub-pixels arranged to pass through the same color filter. The sub-pixels may be arranged in a matrix form. For example, the sub-pixels may be arranged in the form of an M×N matrix (where M and N are natural numbers), such as, for example, a 2×2 matrix, a 3×3 matrix, or the like, a 3×2 matrix, or the like, constituting one color pixel. In an exemplary embodiment, for example, a plurality of sub-pixels that generate pixel signals commonly including green color information may be categorized as green color pixels.

In operation S200, data including information about a reference value for compressing image data may be generated based on respective pixel values of the sub-pixels. In the image compression method according to the inventive concept, a reference sub-pixel may be determined based on pixel values of a plurality of candidate sub-pixels sharing the same color information (operation S200). Pixel information about the reference sub-pixel, e.g., a data value of the reference sub-pixel, may be referred to as a reference value. Alternatively, the reference value may be a value calculated from a plurality of pixel data values. According to an exemplary embodiment, the reference value may be used as a criterion for compressing image data.

In operation S300, difference values may be calculated by comparing pixel values of a plurality of sub-pixels included in the same color pixel with the reference value, and a result of the comparison and the reference value may be output.

The target sub-pixel to be compressed may be any one of the sub-pixels, and the reference value may also be a value determined based on at least any one of the sub-pixels, and thus, there may be a target sub-pixel that is not different from the reference value as a result of the comparison. In an alternate embodiment, the reference value may be a mode or average data value of the plurality of sub-pixels included in the same color pixel, rather than the data value of a single reference sub-pixel.

In an image compression method according to the present disclosure, because a target sub-pixel to be compressed and a reference sub-pixel to be referred to for compression may be in the same color pixel, the spatial similarity between the target sub-pixel and the reference sub-pixel may be relatively high. In other words, in the above-described image compression method, sub-pixels in the same color pixel are referred to for compressing image data, and thus, the spatial similarity may be high. Therefore, the compression efficiency of image data may be higher than that of the case in which more distant color pixels are used for reference. As the spatial similarity increases, the compression loss of image data may be reduced and/or the compression efficiency may be increased.

Figure 2:
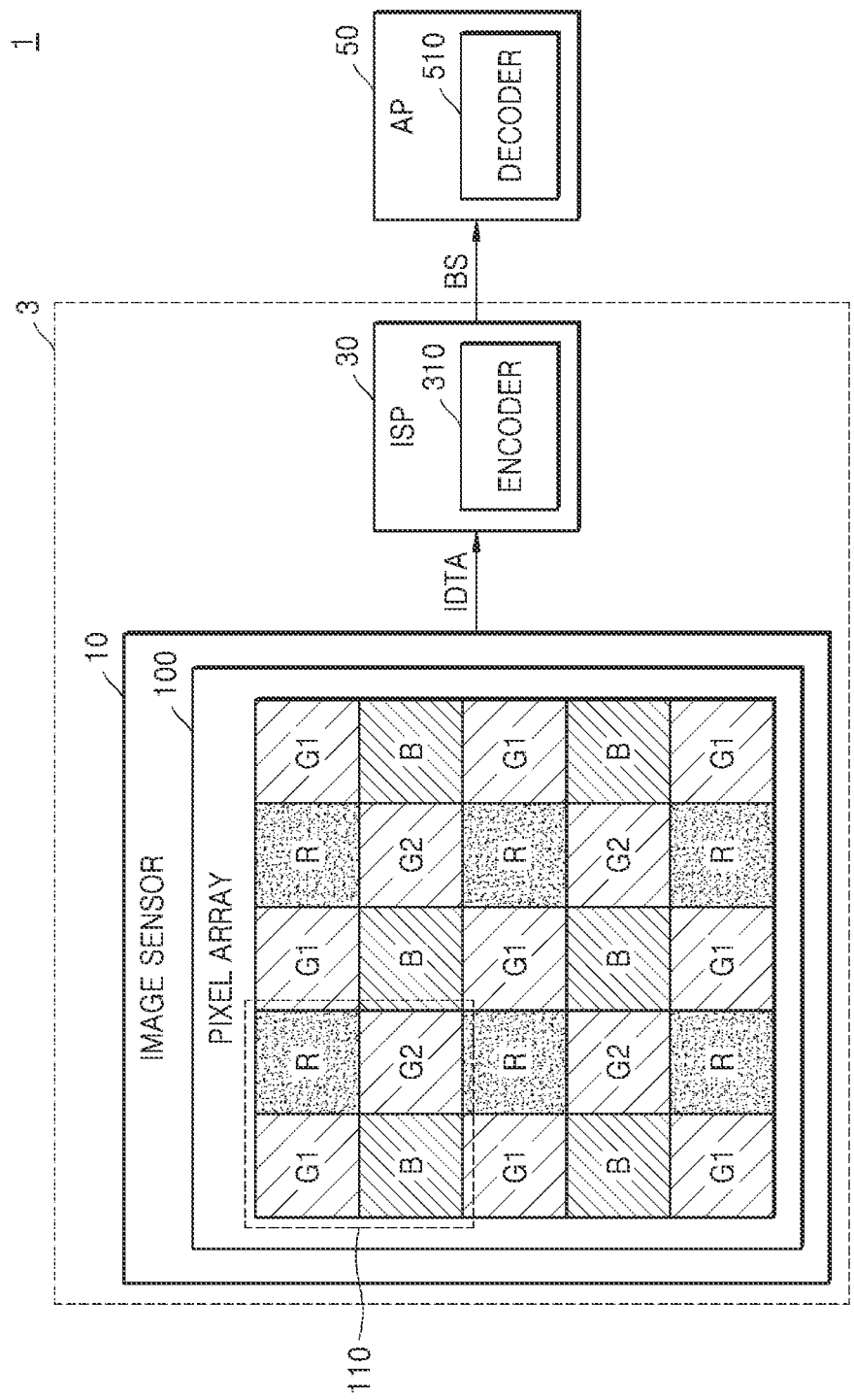
FIG. 2 is a block diagram showing an image capture device according to an exemplary embodiment.

FIG. 2 illustrates an image capture device 1 according to an exemplary embodiment of the present disclosure. The image capture device 1 of FIG. 2 may perform the image compression method described above with reference to FIG. 1.

Referring to FIG. 2, the image capture device 1 may include a camera module 3 and an application processor (AP) 50. The camera module 3 may include an image sensor 10 and an image signal processor (ISP) 30. The image sensor 10 may include a pixel array 100, the ISP 30 may include an encoder 310, and the AP 50 may include a decoder 510.

The image capture device 1 may capture and/or store an image of an object by using a solid-state image sensor such as a charge-coupled device, a complementary metal oxide semiconductor (CMOS) sensor, or the like, and may be implemented as a digital camera, a digital camcorder, a mobile phone, a tablet computer, a portable electronic device, or the like. The portable electronic device may include a laptop computer, a mobile phone, a smart phone, a tablet or personal computer (PC), a personal digital assistant (PDA), an enterprise digital assistant (EDA), a digital still camera, a digital video camera, an audio device, a portable multimedia player (PMP), a personal navigation device (PND), an MP3 player, a handheld game console, an e-book device, a wearable device, or the like. Moreover, the electronic device 1 may be installed on another device such as a drone, an advanced driver assistance system (ADAS), or an electronic device provided as a component of a vehicle, furniture, a manufacturing facility, a door, various measuring devices, or the like.

The image sensor 10 may convert optical signals of an object incident through an optical lens into electrical signals by using photoelectric conversion elements, generate image data IDTA based on the electrical signals, and output the image data IDTA. The image sensor 10 may be installed on an electronic device having a function for sensing an image or light. For example, the image sensor 10 may be installed on an electronic device such as a camera, a smartphone, a wearable device, an Internet of Things (IoT) device, a tablet or PC, a PDA, a PMP, a navigation device, a drone, and/or an ADAS. Moreover, the image sensor 10 may be installed on an electronic device provided as a component of a vehicle, furniture, a manufacturing facility, a door, and various measuring devices. The image sensor 10 may sense an object photographed through a lens under the control of the ISP 30 or the AP 50.

The image sensor 10 may include a pixel array 100 and a plurality of functional units that process received optical signals. The functional units may include additional components for processing optical signals or improving image sensing sensitivity, such as, for example, a row driver, a ramp signal generator, a timing generator, an analog-to-digital converter, a read-out circuit, or the like.

The pixel array 100 may include a plurality of row lines, a plurality of column lines, a plurality of pixels that are each connected to a row line and a column line and are arranged in a matrix form, and a plurality of color filters arranged in correspondence with respective pixels.

The pixels may each include a light sensing element such as a photoelectric conversion element, detect light by using the light sensing element, and convert the detected light into a pixel signal, which may be an electrical signal. For example, the light sensing element may be a photodiode, a photo transistor, a photo gate, a pinned photodiode (PPD), or a combination thereof. Each of a plurality of light sensing elements may have a 4-transistor structure including a photodiode, a transfer transistor, a reset transistor, an amplification transistor, and a selection transistor. According to alternate embodiments, each of the light sensing elements may have a 1-transistor structure, a 3-transistor structure, a 5-transistor structure, or a structure in which a plurality of pixels share some transistors.

The image sensor 10 may obtain pixel data from optical signals that have passed through a color filter. The pixel data may refer to incident light intensity or pixel values of pixels. Color filters may be arranged in correspondence with respective pixels in the pixel array, thereby serving as a filter that transmits only particular wavelengths from light incident on the light sensing elements of the image sensor. One color pixel may include a plurality of sub-pixels, and each of the sub-pixels may operate as a unit element for processing one color.

A color filter may be applied in the form of a Bayer color filter. A Bayer pattern is based on the premise that human eyes obtain most of their luminance data from green components of an object. Half of pixels included in a Bayer color filter may detect green signals, one-fourth of the pixels may detect red signals, and the other one-fourth of the pixels may detect blue signals. According to an embodiment, a Bayer color filter may have a configuration in which 2×2 cells including a red (R) pixel, a blue (B) pixel, and two green (G) pixels are repeatedly arranged. According to another embodiment, the Bayer color filter may have a configuration in which 2×2 cells including a red pixel, a blue pixel, and two wide green (W) pixels are repeatedly arranged. In other words, an RGB color filter scheme may be employed in which a green filter is provided for two of four pixels and a blue filter and a red filter are provided for the other two pixels. Moreover, other than the RGB color filter scheme, a CYGM color filter scheme in which cyan, yellow, green, and magenta color filters are respectively arranged in four pixels is also employed. Moreover, a cyan, yellow, green, key (CYMK) color filter scheme may be applied. A plurality of color filters may be considered to constitute one color filter layer. Although the Bayer pattern is illustrated for convenience of explanation, the present disclosure is not limited to the Bayer pattern, and color filters may be applied that include a white or yellow color filter or color filters having various patterns in which two or more color regions are merged.

Pixel data or a set of pixel values generated by passing through color filters may be referred to as a Bayer image. Here, the Bayer image is distinguished from a color filter that physically transmits particular wavelengths of light, and the Bayer image may correspond with an image sensed by the image sensor 10, or be recognized as a conceptual image shape recognized by the ISP 30, the AP 50, or recognized in a user environment. In other words, the Bayer image may refer to image data containing pixel information of a completed image that is treated as one processing unit in the image capture device 1. For convenience of explanation, image data will be described below by using the term 'Bayer image'. However, the present disclosure is not limited to color filters of Bayer patterns, and color filters having various patterns may be applied.

The image sensor 10 may output image data IDTA generated by pre-processing, such as bad pixel removal or the like, pixel signals generated by the pixel array 100. The image sensor 10 may be implemented as a semiconductor chip, a package including a pixel array, or the like. The pixel array 100 may include a plurality of cells 110.

The ISP 30 may receive the image data IDTA, which is an output signal, from the image sensor 10, process the image data IDTA as an image recognizable by a human, and output a processed image to a display. Alternatively, the ISP 30 may receive a control signal from an external host through an interface (I/F) and responsively provide a processed image to the external host.

The ISP 30 may perform image processing on the image data IDTA. For example, the ISP 30 may perform image processing for changing a data format of the image data IDTA, such as, for example, changing image data of the Bayer pattern to image data of the YUV format or to the RGB format, and image processing for improving image quality such as noise reduction, brightness adjustment, and/or sharpness adjustment. The ISP 30 may be implemented as a hardware component of the image capture device 1. Although FIG. 2 shows that the ISP 30 is provided separately from the image sensor 10, the present disclosure is not limited thereto, and the ISP 30 may be located inside the image sensor 10 or inside the AP 50, without limitation.

The ISP 30 may include the encoder 310. The encoder 310 may encode the image data IDTA and output encoded image data IDTA in the form of a bit stream BS.

The encoder 310 may reduce data size by compressing the image data IDTA corresponding to pixel data obtained through color filters. Image data may refer to pixel data of various patterns obtained through color filters. Because original pixel data is pixel data or a pixel value of a pixel to be compressed, the original pixel data may be referred to as a pixel value of a target sub-pixel. According to an embodiment of the present disclosure, the encoder 310 may generate encoded data for pixel data based on a plurality of sub-pixels included in a pixel. A process for compressing pixel data based on a plurality of sub-pixels may be described below in greater detail with reference to FIGS. 2 to 14.

The camera module 3 may include the image sensor 10 and the ISP 30. In other words, a combination of the image sensor 10 and the ISP 30 that processes image data IDTA output from the image sensor 10 may be referred to as the camera module 3. The camera module 3 may compress a captured image and output a result of the compression as a bit stream BS.

The bit stream BS generated by the camera module 3 may be decoded by a device, such as or including a decoder, for example, sharing the same protocol as the camera module 3. The protocol is a shared communication principle for a compression algorithm such as a compression method, a compression sequence, and a compression bit, and may indicate a mutual agreement enabling decoding by applying the same mechanism as an encoding mechanism. In an exemplary embodiment, the bit stream BS generated by the camera module 3 may be decoded as long as the protocol applied to the encoder 310 included in the camera module 3 is the same as one supported by the AP 50 and/or the decoder 510, and thus a decoder need not be mounted on the same semiconductor chip with the encoder 310.

The AP 50 may be a central processing unit (CPU), a microprocessor, or a microcontroller unit (MCU). The AP 50 may perform post processing on the bit stream BS. The post processing may refer to application of an image enhancement algorithm to image artifacts. For example, the AP 50 may perform white balancing correction, automatic focus correction, auto exposure correction, denoising, de-mosaic filtering, lens shading, and/or gamma correction on a received bit stream BS. However, the present disclosure is not limited thereto, and various functions for improving image quality may be performed.

The decoder 510 may receive the bit stream BS including encoded data generated by the encoder 310, and decode the received bit stream BS. The decoder 510 may perform a series of processes reciprocal to those that the encoder 310 performs to encode the image data IDTA in reverse order, thereby restoring original pixels corresponding to original image data. In other words, the decoder 510 may restore or decompress the compressed image data IDTA received from the encoder 310. In other words, the same protocol may be used by the encoder 310 and the decoder 510.

Each of the modules shown in FIG. 2, that is, the image sensor 10, the ISP 30, and the AP 50, may be implemented by a single processor or the modules may be independently implemented by different processors, respectively. Hereinafter, the term 'pixel value' may refer to a value in which signals corresponding to an optical signal input to light sensing elements on the pixel array 11, such as through a color filter, are processed as image data.

The ISP 30 and the AP 50 may be implemented as processing circuits such as hardware including logic circuits or may be implemented as a combination of hardware and software such as a processor that executes software for performing a compression operation. More particularly, a processing circuit may be implemented by a central processing unit (CPU), an arithmetic logic unit (ALU) that performs arithmetic and logic operations and bit shifting, a digital signal processor (DSP), a microprocessor, or an application specific integrated circuit (ASIC), but the present disclosure is not limited thereto.

Figure 3:
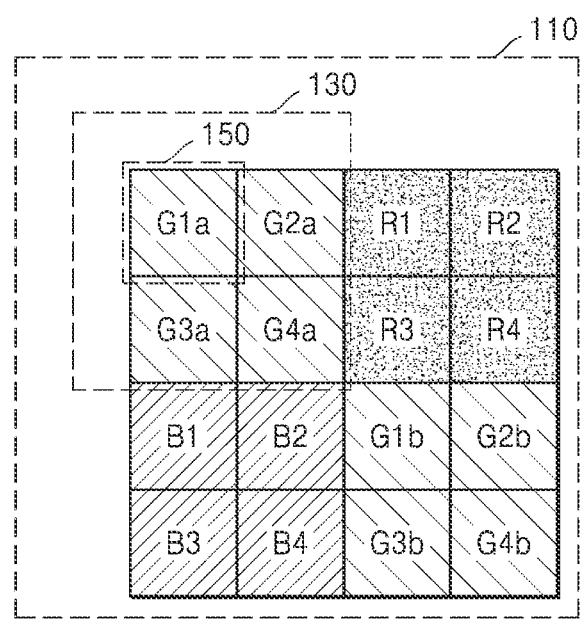
FIG. 3 is a schematic diagram of a cell in which color pixels including a plurality of sub-pixels are arranged in a Bayer pattern according to an exemplary embodiment.

FIG. 3 illustrates a cell 110 of a larger pixel array in which color pixels 130 including a plurality of sub-pixels 150 are arranged in a Bayer pattern according to an exemplary embodiment of the present disclosure. FIG. 3 may be described with reference to FIG. 2, and duplicate description may be omitted.

In image data generated by an image sensor (100 and 110 of FIG. 2), pixel information regarding an object may be arranged in the Bayer pattern. As described above, image data of the Bayer pattern may be referred to as a Bayer image.

The image data may include the plurality of cells 110. Each cell 110 may include a pixel including color information. In an exemplary embodiment, the cell 110 may include one red pixel, two green pixels, and one blue pixel. The cell 110 may include color information regarding a portion of a sensed object and may correspond to a portion of a pixel array (100 of FIG. 2). The cell 110 may be a basic unit for displaying color information regarding a portion of an object.

The cell 110 may include a plurality of color pixels 130. In an exemplary embodiment, the color pixels 130 of a cell 110 may include two green pixels, one red pixel, and one blue pixel according to an arrangement of color pixels included in the pixel array 100.

Each color pixel 130 may include a plurality of sub-pixels 150 of the same color. Because the sub-pixels 150 included in one color pixel 130 are formed through the same color filter, the sub-pixels 150 may have the same color information.

The sub-pixels 150 may be arranged in a matrix form. Although FIG. 3 shows an example in which the arrangement of the sub-pixels 150 is a 2×2 matrix of sub-pixels within a larger 2×2 matrix of pixels, the present disclosure is not limited thereto, and the sub-pixels 150 may be arranged in an M×N matrix (where M and N are natural numbers), such as, for example, a 2×3 matrix or a 3×3 matrix, without limitation. Moreover, in an alternate embodiment, each cell of sub-pixels need not be configured as a tetra cell, and may be a tri and/or a hexa cell for a planar image sensor; or a penta cell for a hyperbolic or spherical image sensor, for example, without limitation thereto. Moreover, in an alternate embodiment, the green sub-pixels may be arranged in hexa cells, while the red and blue sub-pixels may be arranged in tri cells.

In an exemplary embodiment, a green pixel may include four green sub-pixels G1$a$, G2$a$, G3$a$, and G4$a$. Similarly, according to an exemplary embodiment, a blue pixel may include four blue sub-pixels B1, B2, B3, and B4, a red pixel may include four red sub-pixels R1, R2, R3, and R4, and image data may include two green pixels, and thus another green pixel may include four different green sub-pixels G1b, G2b, G3b, and G4b.

Although two green pixels included in one cell 110 have the same color information, the two green pixels may be physically arranged to process different characteristics, and thus, the two green pixels may be distinguished from each other. In an exemplary embodiment, a green pixel of a first row of the cell 110 may be related to the characteristics of a red pixel, and a green pixel of a second row may be related to the characteristics of a blue pixel, but the present disclosure is not limited thereto.

As the sub-pixels 150 generate sub-pixel signals for the same color, an image capture device (see FIGS. 2 and 1) sums the sub-pixel signals, thereby generating a sufficient electrical signal, which is a result of sensing light, even at low illumination levels.

Figure 4A:
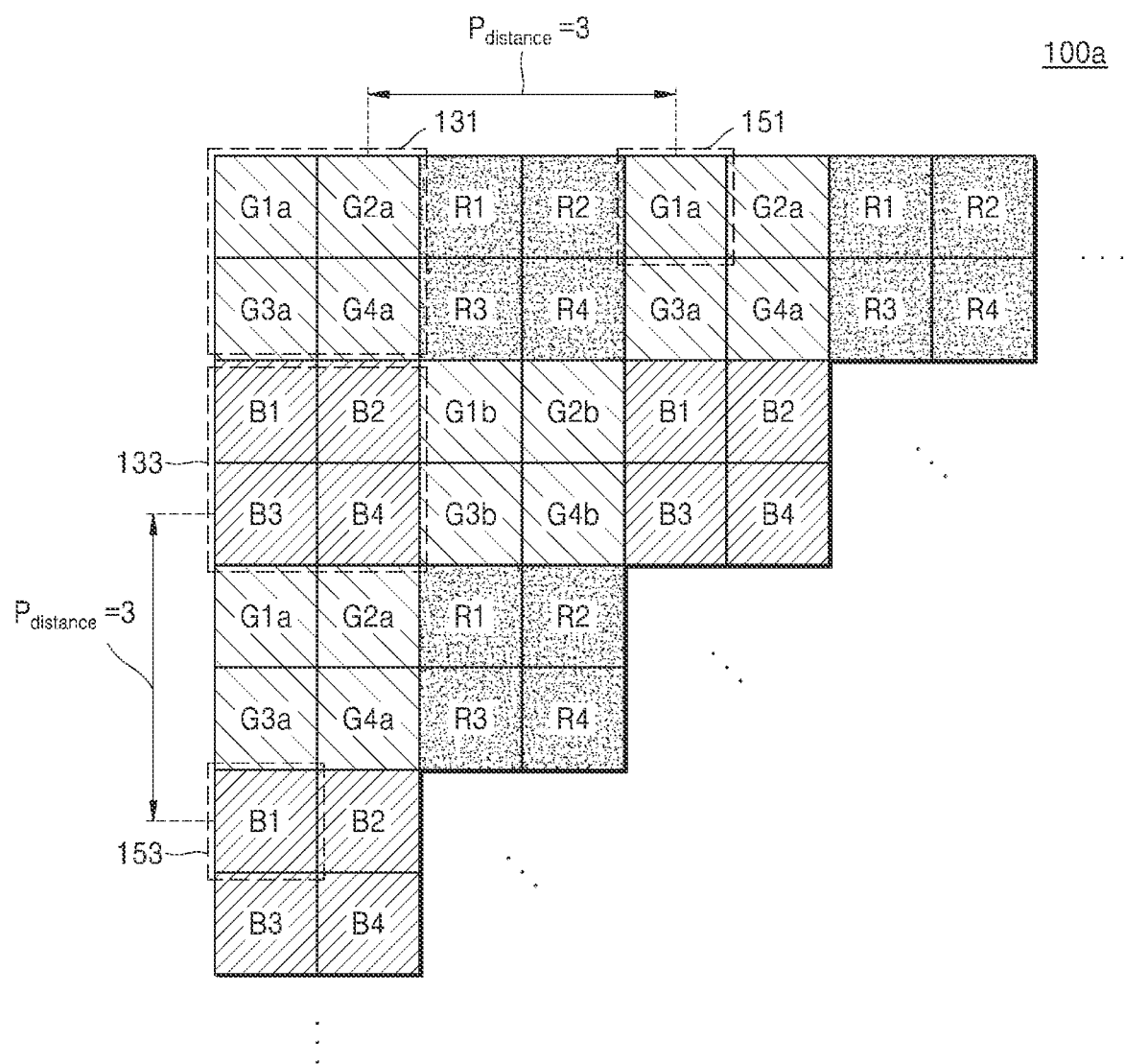
FIGS. 4A and 4B are schematic diagrams showing a pixel array according to an exemplary embodiment.
Figure 4B:
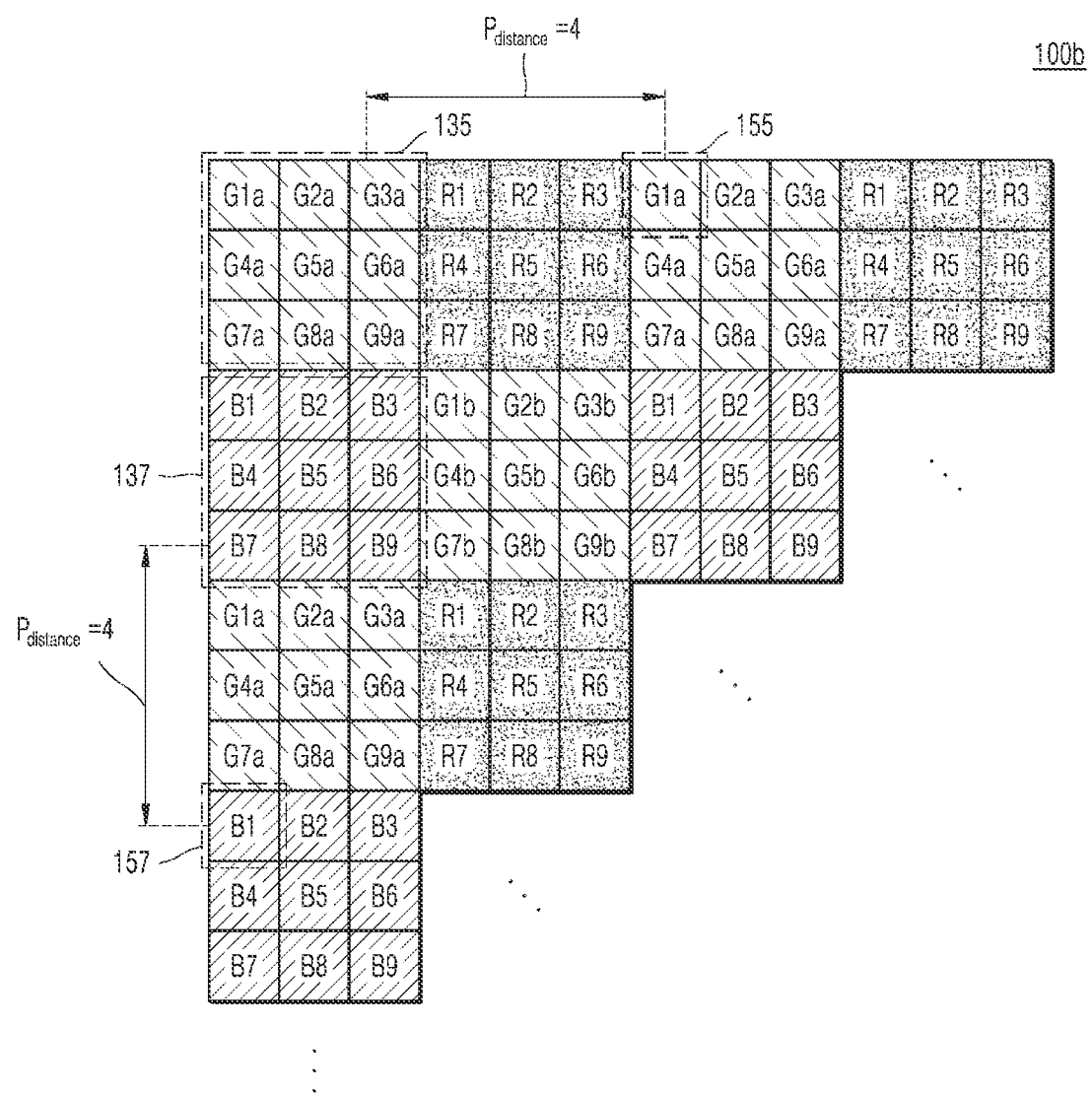

FIGS. 4A and 4B illustrate an example of a pixel array 100a. FIGS. 4A and 4B may be described with reference to FIGS. 2 and 3, and duplicate description may be omitted.

When a target sub-pixel to be compressed and only one reference sub-pixel from among candidate sub-pixels adjacent to the target sub-pixel are determined, and only a pixel difference value between the target sub-pixel and the reference sub-pixel is stored or processed, an amount of data to be processed and/or stored may be reduced. For example, a prediction encoding method, a differential pulse code modulation (DPCM) method, or similar methods may be used.

Referring to FIG. 4A, according to an exemplary embodiment, it is assumed that the sub-pixels 150 included in the color pixel 130 are arranged in a 2×2 matrix. When the number of sub-pixels is 4, a cell including the same may be referred to as a tetra cell.

To compress one sub-pixel 151 (i.e., a target sub-pixel) in a first row of the pixel array 100a, a camera module (e.g., the camera module 3 of FIG. 2)) may search for a reference sub-pixel including substantially the same color information. Any one of the candidate sub-pixels may be determined as the reference sub-pixel, or the reference sub-pixel may be determined based on values of the candidate sub-pixels. In an alternate embodiment, the reference sub-pixel may be a virtual sub-pixel based on an average of the sub-pixels in the cell. for example.

A sub-pixel that senses substantially the same color information as the target sub-pixel 151 and is closest to the target sub-pixel 151 may be determined as a reference sub-pixel 131. To refer to pixel information, a candidate sub-pixel may be read first or processed, such as compressed, before the target sub-pixel 151, and thus a row below that of the target sub-pixel 151 need not be referenced. Moreover, if the target sub-pixel is red or blue in this example, because a green sub-pixel in a row immediately above that of the target sub-pixel 151 may have different characteristics from the target sub-pixel 151, the green sub-pixel need not be referenced. As a result, the reference sub-pixel 131 may be the pixel of substantially same color closest to the target sub-pixel 151.

Because the target sub-pixel 151, if green, is surrounded by red pixels and blue pixels, the red pixels and the blue pixels are sensed before the target sub-pixel 151, and a pixel distance Pdistance may be 3 between the reference sub-pixel 131, which is closest to the target sub-pixel 151 from among pixels sensing substantially the same color information as the target sub-pixel 151, and the target sub-pixel 151. Hereinafter, it is assumed that the width of one sub-pixel is 1.

Similarly, a target sub-pixel 153 included in a blue pixel may determine a pixel having substantially the same color information 'blue' and being closest to the target sub-pixel 153 as a reference sub-pixel 133. The pixel distance Pdistance between the target sub-pixel 153 and the reference sub-pixel 133 may also be 3.

Referring to FIG. 4B, according to an exemplary embodiment, a pixel array 100b in which the sub-pixels 150 are arranged in a 3×3 matrix is assumed. When the number of sub-pixels is 9, a cell including the same may be referred to as a nona cell.

To compress one sub-pixel 155 as a target sub-pixel, and hereinafter referred to as such, in a first row of the pixel array 100b, the camera module 3 may search for a reference sub-pixel including substantially the same color information. As a result, a pixel having substantially the same color information 'green' as the target sub-pixel 155 and being closest to the target sub-pixel 155 may be determined as a reference sub-pixel 134. The distance between the target sub-pixel 155 and the reference sub-pixel 134 may additionally include 3, which is the width of one color pixel and the sum of the widths of sub-pixels. As a result, the pixel distance Pdistance between the target sub-pixel 155 and the reference sub-pixel 134 may also be 4.

Similarly, a target sub-pixel 157 included in a blue pixel may determine a pixel having substantially the same color information 'blue' and being closest to the target sub-pixel 157 as a reference sub-pixel 137. The pixel distance Pdistance between the target sub-pixel 157 and the reference sub-pixel 137 may also be 4.

Figure 5A:
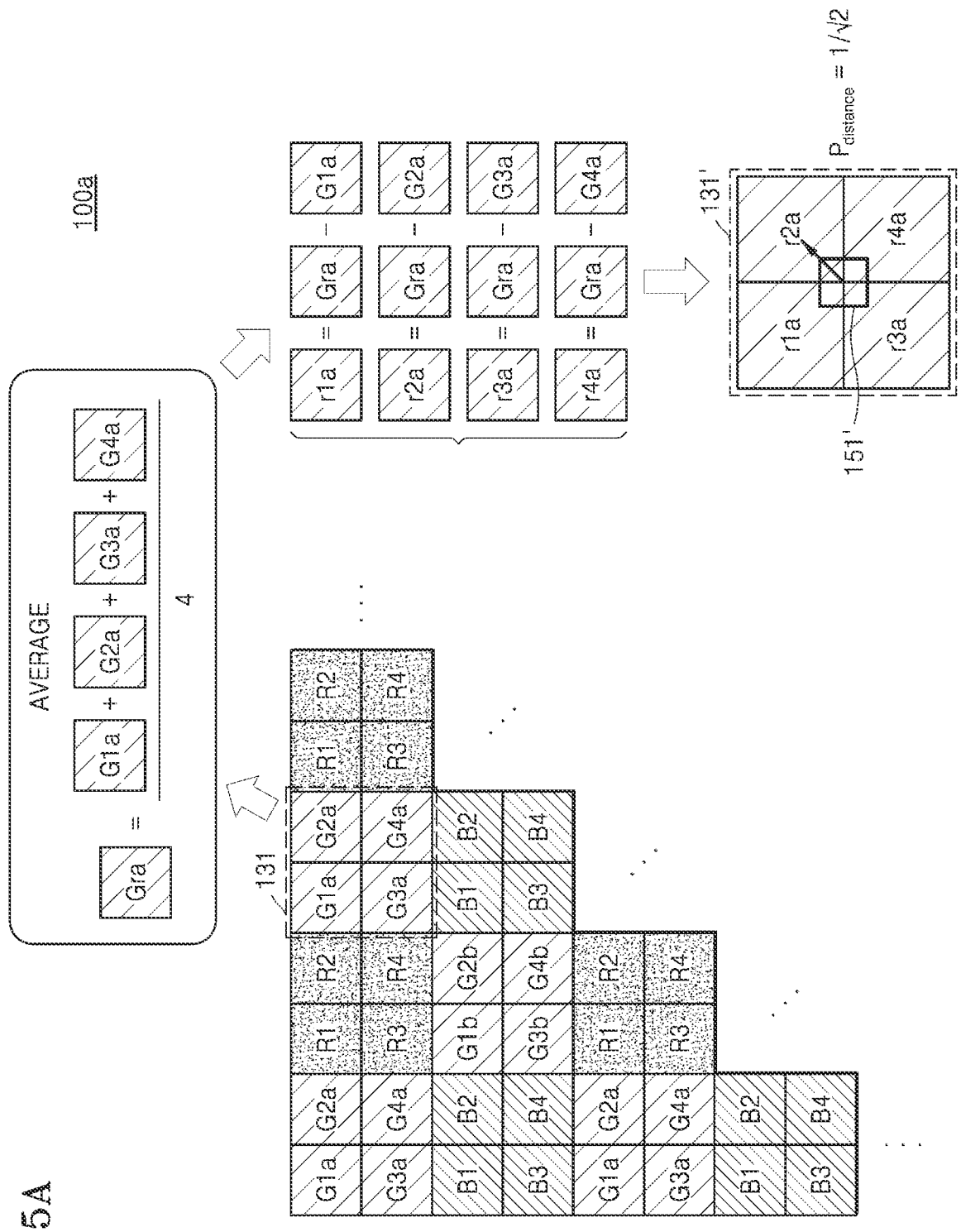
FIGS. 5A, 5B, and 5C are hybrid schematic diagrams showing a process for determining a reference value according to an exemplary embodiment.
Figure 5B:
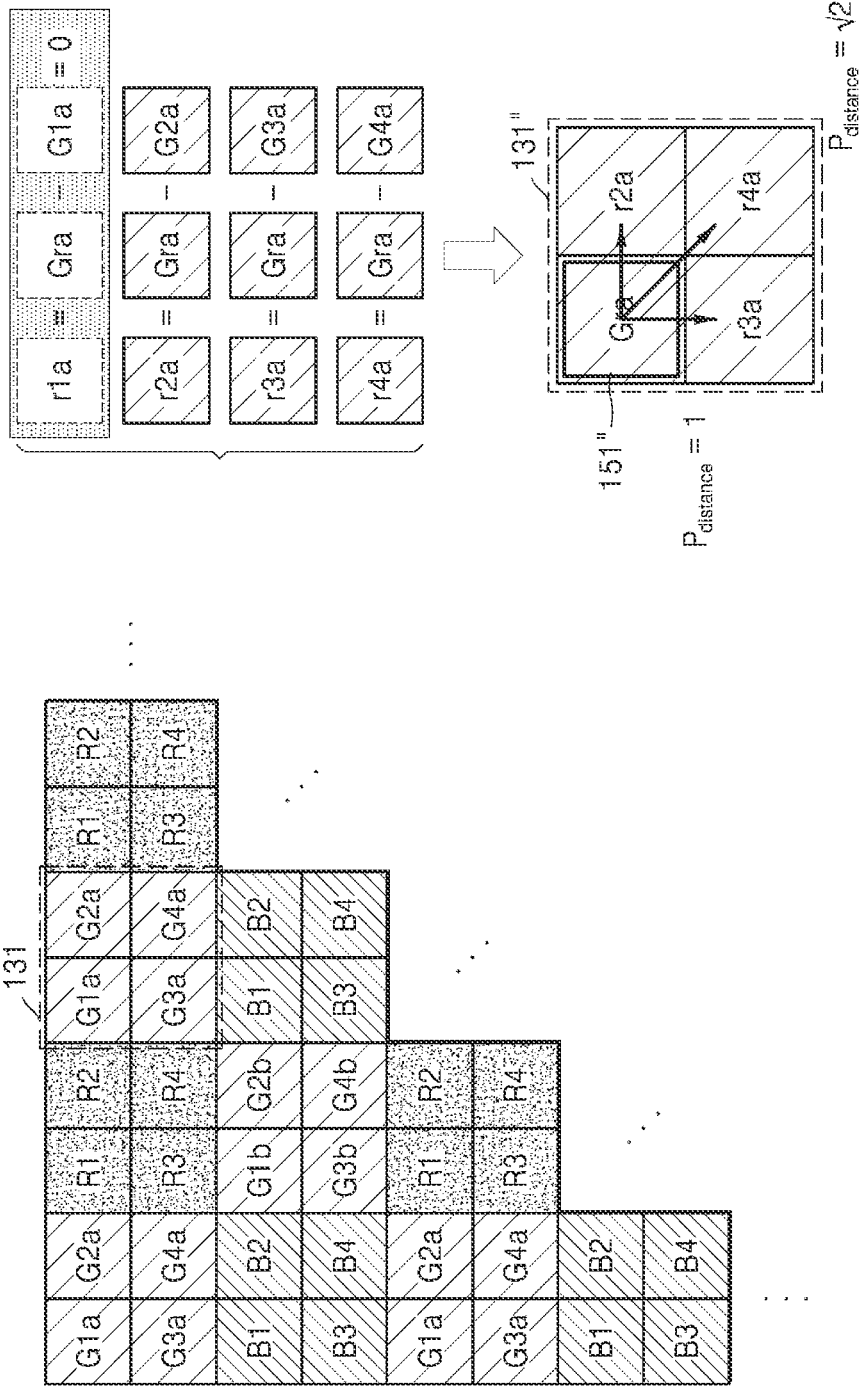
Figure 5C:
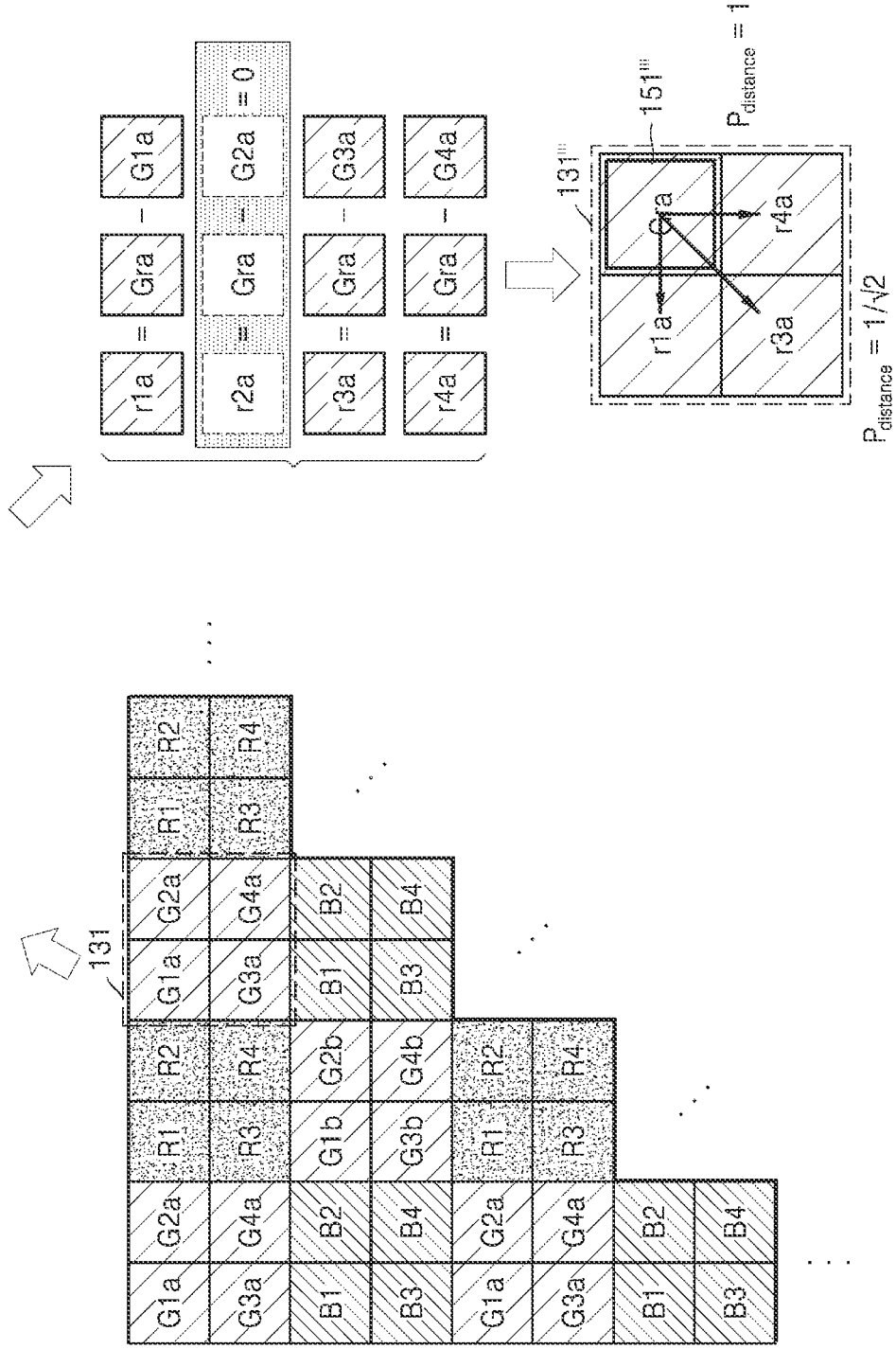

FIGS. 5A, 5B, and 5C illustrate a process for determining a reference value according to an exemplary embodiment of the present disclosure. FIGS. 5A, 5B, and 5C may be described with reference to FIGS. 2, 3 and 4A, and duplicate description may be omitted. In an exemplary embodiment, a pixel array 100a in which the sub-pixels 150 are arranged in a 2×2 matrix is assumed.

In the image compression method according to the present disclosure, a reference value may be determined based on a plurality of sub-pixels (i.e., candidate sub-pixels) sharing substantially the same color information. Specifically, a reference sub-pixel may be determined within the color pixel 131 including a target sub-pixel to be compressed (151 of FIG. 4A) and including color information about green color or may be determined based on at least one of a plurality of sub-pixels included in the color pixel 131.

According to an exemplary embodiment, the color pixel 131 including the target sub-pixel (131 in FIG. 4) may include four sub-pixels G1a, G2a, G3a, and G4a. In other words, the target sub-pixel 131 may be any one of the four sub-pixels G1a, G2a, G3a, and G4a.

Referring to FIG. 5A, the camera module (3 of FIG. 2, and in particular, the encoder 310 of FIG. 2) may calculate an average of pixel values of the four sub-pixels G1a, G2a, G3a, and G4a included in the color pixel 131. The camera module 3 may determine an average pixel value of the four sub-pixels G1a, G2a, G3a, and G4a as a reference value. When there is no sub-pixel having the average pixel value of the four sub-pixels G1a, G2a, G3a, and G4a, it may be understood that the average pixel value of the four sub-pixels G1a, G2a, G3a, and G4a may be virtually at the center of the matrix of the four sub-pixels G1a, G2a, G3a, and G4a due to its mathematical characteristics. In an exemplary embodiment, a sub-pixel Gra having an average pixel value as the pixel value may virtually exist.

The camera module 3 may compare the pixel value of each of the four sub-pixels G1a, G2a, G3a, and G4a with the reference value. In an exemplary embodiment, the camera module 3 may perform subtraction between the reference value and the pixel value of each of the four sub-pixels G1a, G2a, G3a, and G4a. In an exemplary embodiment, a residual sub-pixel r1a having a difference value between the pixel value of a sub-pixel G1a and a reference value Gra may be generated, a residual sub-pixel r2a having a difference value between the pixel value of a sub-pixel G2a and the reference value Gra may be generated, a residual sub-pixel r3a having a difference value between the pixel value of a sub-pixel G3a and the reference value Gra may be generated, and a residual sub-pixel r4a having a difference value between the pixel value of a sub-pixel G4a and the reference value Gra may be generated. The order of a subtraction operation is not limited, and a reference value may be subtracted from a sub-pixel value. In an exemplary embodiment, the order of a subtraction operation may be determined in advance, and the order of the subtraction operation determined in advance by the encoder 310 may be referred to by the decoder (510 of FIG. 2) to decode encoded data. Although determination of the residual sub-pixel values is shown here as a subtraction operation, in an alternate embodiment, the residual sub-pixel values r1a, r2a, r3a and r4a may be determined by division of one of the target or the reference by the other of the target or reference for each target sub-pixel of each pixel cell, respectively.

The ISP (30 of FIG. 2) may compress image data by generating the reference value and respective pixel values of residual sub-pixels as the bit stream BS instead of transmitting the pixel values of sub-pixels included in the same color pixel.

It may be assumed that residual sub-pixels r1a, r2a, r3a, and r4a are arranged in a 2×2 matrix similar to that of the four sub-pixels G1a, G2a, G3a, and G4a. In this case, it may be understood that a set of the residual sub-pixels r1a, r2a, r3a, and r4a is a color pixel 131' that generates green color information. A reference sub-pixel 151' having an average pixel value as the pixel value may be virtually at the center of the matrix of the residual sub-pixels r1a, r2a, r3a, and r4a.

Assuming that the width of a sub-pixel is 1, the pixel distance Pdistance between the reference sub-pixel 151' and each of the residual sub-pixels r1a, r2a, r3a, and r4a may be $1/\sqrt{2}$. Comparing FIG. 5A with FIG. 4A, the pixel distance Pdistance may be reduced from 3 to $1/\sqrt{2}$. It may be understood that the reduction of the pixel distance Pdistance corresponds to increased spatial similarity. As the spatial similarity increases, the image compression efficiency of the image compression method according to the present disclosure may be improved, and compression loss of image data may be reduced.

Referring to FIG. 5A, the camera module 3 (in particular, the encoder 310) may calculate a median of pixel values of the four sub-pixels G1a, G2a, G3a, and G4a included in the color pixel 131.

In detail, the camera module 3 may sort the pixel value of the four sub-pixels G1a, G2a, G3a, and G4a according to the sizes thereof. The camera module 3 may determine the sub-pixel G1a having the second smallest pixel value from among a plurality of pixel values as a reference sub-pixel 151". Generally, a median value may refer to the average value of two values close to the median when the number of values is an even number. However, according to the present disclosure, it may be understood that a median refers to the smaller value of two pixel values. However, the present disclosure is not limited thereto, and the median may refer to the larger value of the two pixel values. The pixel value of the reference sub-pixel 151" may be determined as the reference value Gra. In other words, the reference sub-pixel 151" may be a virtual sub-pixel included in the color pixel 131.

The camera module 3 may compare the pixel value of each of the four sub-pixels G1a, G2a, G3a, and G4a with the reference value. In an exemplary embodiment, the camera module 3 may perform subtraction between the reference value Gra and the pixel value of each of the four sub-pixels G1a, G2a, G3a, and G4a. In an exemplary embodiment, because the reference value Gra is identical to the sub-pixel G1a, a result of performing a subtraction operation may be zero (0). Because a residual sub-pixel r1a has zero data, there is no physical meaning. However, the residual sub-pixel r1a may be assumed abstractly. In the same regard, a residual sub-pixel r2a having the sub-pixel value identical to a difference value between the reference value Gra and the pixel value of the sub-pixel G2a may be generated, a residual sub-pixel r3a having the sub-pixel value identical to a difference value between the reference value Gra and the pixel value of the sub-pixel G3a may be generated, and a residual sub-pixel r4a having the sub-pixel value identical to a difference value between the reference value Gra and the pixel value of the sub-pixel G4a may be generated. The order of a subtraction operation is not limited, as already stated above. The ISP (30 of FIG. 2) may compress image data by generating the reference value and respective pixel values of residual sub-pixels r2a, r3a, and r4a as the bit stream BS instead of transmitting the pixel values of sub-pixels included in the same color pixel.

It may be understood that the set of the residual sub-pixels r1a, r2a, r3a, and r4a is a color pixel 131" that generates green color information. The reference sub-pixel 151" may correspond to the sub-pixel G1a. In an exemplary embodiment, the pixel distance Pdistance between the reference sub-pixel 151" and residual sub-pixels r2a and r3a may be 1, and the pixel distance Pdistance between the reference sub-pixel 151" and the residual sub-pixel r4a may be $\sqrt{2}$. Comparing FIG. 5B with FIG. 4A, the pixel distance Pdistance may be reduced from 3 to 1 or from 3 to $\sqrt{2}$. In the same regard, it may be understood that the reduction of the pixel distance Pdistance corresponds to increased spatial similarity.

Referring to FIG. 5C, the camera module 3 (in particular, the encoder 310) may determine any one (the sub-pixel G2a) of the four sub-pixels G1a, G2a, G3a, and G4a included in the color pixel 131 as the reference sub-pixel 151". The position of a sub-pixel to be determined as the reference sub-pixel 151''' may be determined in advance. For example, a sub-pixel to be determined as the reference sub-pixel 151''' may be a sub-pixel provided in a first column and a second row from among a plurality of sub-pixels in a color pixel. The position of a sub-pixel determined in advance may be referred to by the encoder 310 and the decoder 510.

The camera module 3 may compare the pixel value of each of the four sub-pixels G1a, G2a, G3a, and G4a with the reference value. In an exemplary embodiment, the camera module 3 may perform subtraction between the reference value and the pixel value of each of the four sub-pixels G1a, G2a, G3a, and G4a. In an exemplary embodiment, because the reference value Gra is identical to the sub-pixel G2a, a result of performing a subtraction operation may be zero (0). Because a residual sub-pixel r2a has zero data, there is no physical meaning. However, the residual sub-pixel r2a may be assumed abstractly. In the same regard, a residual sub-pixel r1a having the sub-pixel value identical to a difference value between the reference value Gra and the pixel value of the sub-pixel G1a may be generated, the residual sub-pixel r3a having the sub-pixel value identical to a difference value between the reference value Gra and the pixel value of the sub-pixel G3a may be generated, and the residual sub-pixel r4a having the sub-pixel value identical to a difference value between the reference value Gra and the pixel value of the sub-pixel G4a may be generated. The order of a subtraction operation is not limited, as already stated above. The ISP (30 of FIG. 2) may compress an image by generating residual sub-pixels r1a, r3a, and r4a, which are difference values between the reference value and the pixel values of sub-pixels, as the bit stream BS instead of transmitting the pixel values of all of the sub-pixels.

It may be understood that the set of the residual sub-pixels r1a, r2a, r3a, and r4a is a color pixel 131''' that generates green color information. A reference sub-pixel 151''' may correspond to the sub-pixel G2a. In an exemplary embodiment, the pixel distance Pdistance between the reference sub-pixel 151''') and residual sub-pixels r1a and r4a may be 1, and the pixel distance Pdistance between the reference sub-pixel 151''' and the residual sub-pixel r3a may be $\sqrt{2}$. Comparing FIG. 5C with FIG. 4A, the pixel distance Pdistance may be reduced from 3 to 1 or from 3 to $\sqrt{2}$. In the same regard, it may be understood that the reduction of the pixel distance Pdistance corresponds to increased spatial similarity.

Figure 6A:
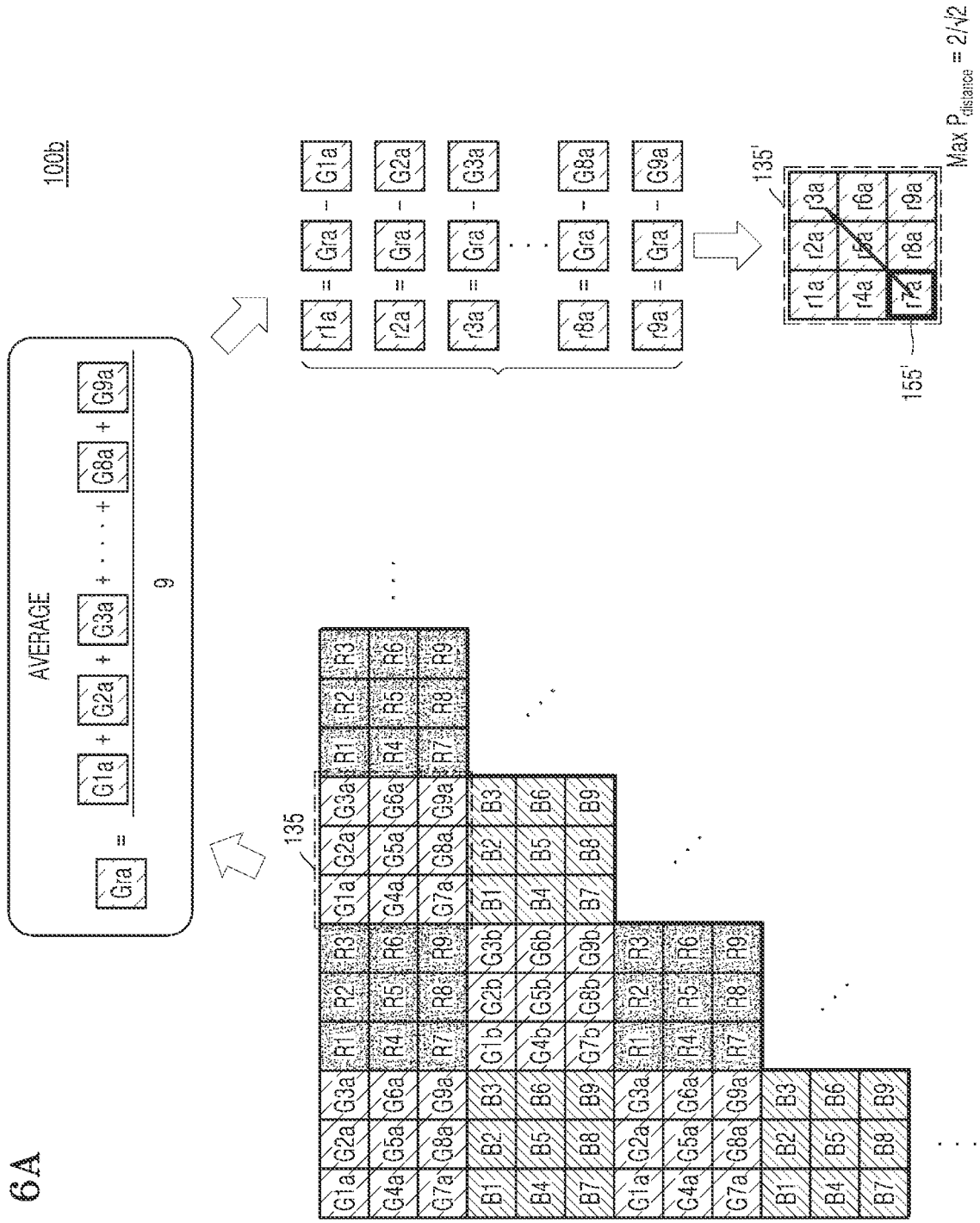
FIGS. 6A, 6B, and 6C are hybrid schematic diagrams showing another process for determining a reference value according to an exemplary embodiment.
Figure 6B:
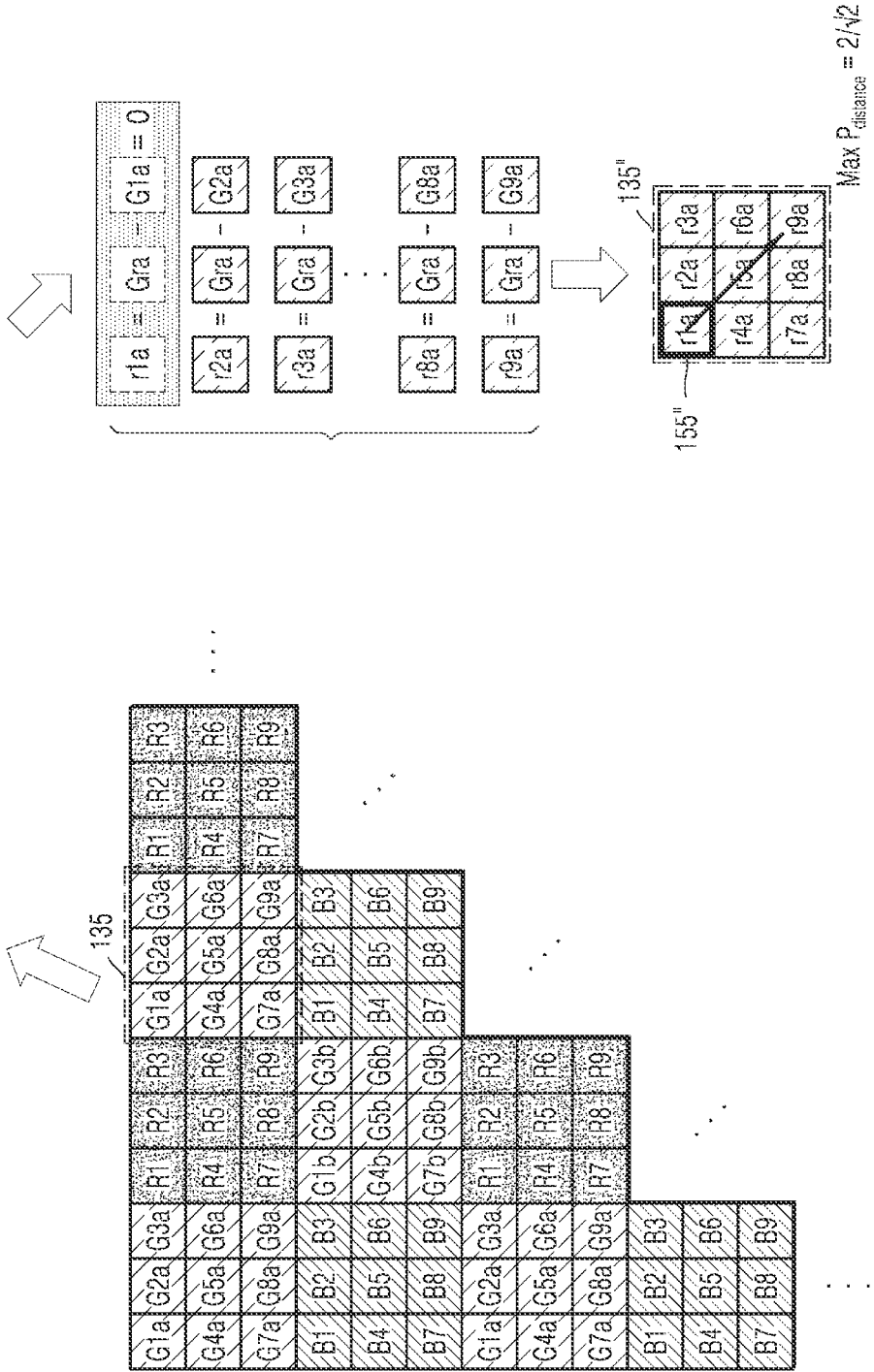
Figure 6C:
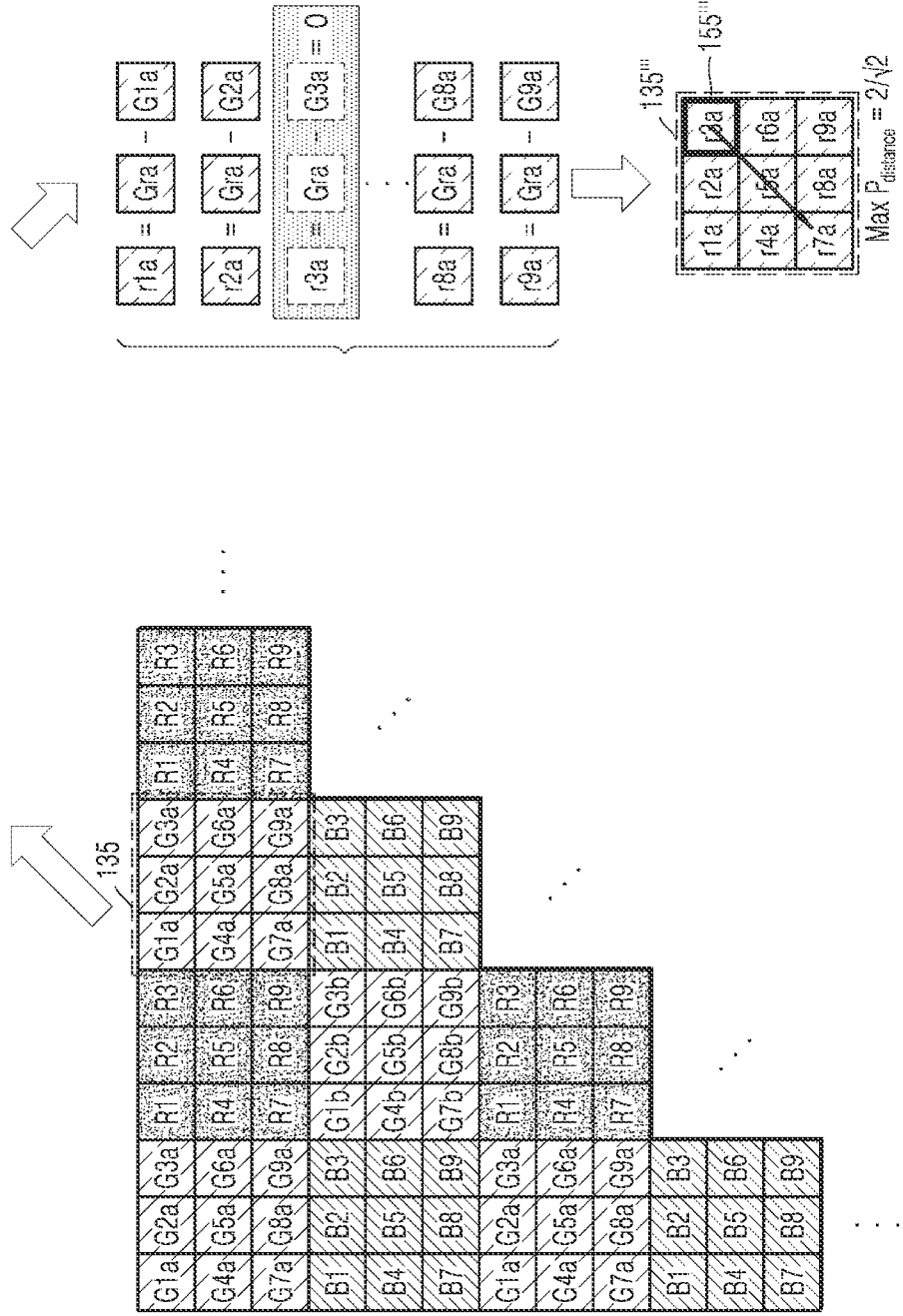

FIGS. 6A, 6B, and 6C illustrate a process for determining a reference value according to an exemplary embodiment of the present disclosure. FIGS. 6A, 6B, and 6C may be described with reference to FIGS. 2, 3, 4B, and 5A to 5C, and duplicate description may be omitted. In an exemplary embodiment, a pixel array 100b in which the sub-pixels 150 are arranged in a 3×3 matrix is assumed.

The image compression method shown in FIGS. 6A to 6C is similar to the image compression method shown in FIGS. 5A to 5C, except that the number of sub-pixels included in one color pixel 135 is 9 and the sub-pixels 150 are arranged in a 3×3 matrix.

Referring to FIG. 6A, the camera module (3 of FIG. 2); and in particular, the encoder (310 of FIG. 2) may calculate an average of the pixel values of nine sub-pixels G1a, G2a, G3a, G4a, G5a, G6a, G7a, G8a, and G9a included in the color pixel 135. The camera module 3 may determine an average pixel value of the nine sub-pixels G1a, G2a, G3a, G4a, G5a, G6a, G7a, G8a, and G9a as a reference value. The reference value may be any one of the pixel values of the nine sub-pixels G1a, G2a, G3a, G4a, G5a, G6a, G7a, G8a, and G9a or may not be one of the pixel values of the nine sub-pixels G1a, G2a, G3a, G4a, G5a, G6a, G7a, G8a, and G9a. In other words, a sub-pixel having a pixel value identical to the average pixel value of the nine sub-pixels G1a, G2a, G3a, G4a, G5a, G6a, G7a, G8a, and G9a may exist and may or may not be included in the color pixel 135. When there is no reference sub-pixel 155' having the pixel value identical to the average pixel value of the nine sub-pixels G1a, G2a, G3a, G4a, G5a, G6a, G7a, G8a, and G9a, it may be understood that the average pixel value of the nine sub-pixels G1a, G2a, G3a, G4a, G5a, G6a, G7a, G8a, and G9a may be virtually at an arbitrary position in the matrix of the nine sub-pixels G1a, G2a, G3a, G4a, G5a, G6a, G7a, G8a, and G9a due to its mathematical characteristics. In an exemplary embodiment, a reference sub-pixel 155' having an average pixel value as the pixel value may virtually exist.

The camera module 3 may compare the pixel value of each of the nine sub-pixels G1a, G2a, G3a, G4a, G5a, G6a, G7a, G8a, and G9a with the reference value. In an exemplary embodiment, the camera module 3 may perform subtraction between the reference value and the pixel value of each of the nine sub-pixels G1a, G2a, G3a, G4a, G5a, G6a, G7a, G8a, and G9a. In an exemplary embodiment, the residual sub-pixel r1a having a difference value between the pixel value of the sub-pixel G1a and the reference value Gra as a sub-pixel value may be generated. In the same regard, residual sub-pixels r2a, r3a, r4a, r5a, r6a, r7a, r8a, and r9a may be generated as results of subtraction operations between the pixel values of sub-pixels G2a, G3a, G4a, G5a, G6a, G7a, G8a, and G9a and the reference value Gra. The order of a subtraction operation is not limited, as already stated above. The ISP (30 of FIG. 2) may compress an image by generating the difference values between the reference value and the pixel values of sub-pixels as the bit stream BS instead of transmitting the pixel values of all of the sub-pixels.

It may be assumed that the residual sub-pixels r1a, r2a, r3a, r4a, r5a, r6a, r7a, r8a, and r9a are arranged in a 3×3 matrix in a similar manner as the sub-pixels G1a, G2a, G3a, G4a, G5a, G6a, G7a, G8a, and G9a. In this case, it may be understood that the set of the residual sub-pixels r1a, r2a, r3a, r4a, r5a, r6a, r7a, r8a, and r9a is a color pixel 135' including green color information.

It is assumed that the position of the reference sub-pixel 155' having the average pixel value as the pixel value is the position of a residual sub-pixel r7a.

Because the width of a sub-pixel is 1, the maximum of the pixel distance Pdistance may be $2\sqrt{2}$, which is the distance between the sub-pixel Gra and the residual sub-pixel r3a. Comparing FIG. 6A with FIG. 4B, the pixel distance Pdistance may be reduced from 4 to $2\sqrt{2}$. It may be understood that the reduction of the pixel distance Pdistance corresponds to increased spatial similarity. As the spatial similarity increases, the image compression efficiency of the image compression method according to the present disclosure may be improved, and compression loss of image data may be reduced.

Referring to FIG. 6B, the camera module 3 (in particular, the encoder 310) may calculate a median of the pixel values of the nine sub-pixels G1a, G2a, G3a, G4a, G5a, G6a, G7a, G8a, and G9a included in the color pixel 135.

In detail, the camera module 3 may sort the pixel value of the nine sub-pixels G1a, G2a, G3a, G4a, G5a, G6a, G7a, G8a, and G9a according to the sizes thereof. The camera module 3 may determine the sub-pixel G1a having the fifth smallest pixel value from among a plurality of pixel values as a reference sub-pixel Gra. The fifth smallest pixel value from among nine pixel values may be the fifth largest pixel value at the same time, and may consequently be the median of the nine pixel values. The pixel value of the reference sub-pixel 155" may be determined as the reference value Gra. In other words, the reference sub-pixel 155" may be included in the color pixel 135".

The camera module 3 may compare the pixel value of each of the nine sub-pixels G1a, G2a, G3a, G4a, G5a, G6a, G7a, G8a, and G9a with the reference value Gra. In an exemplary embodiment, the camera module 3 may perform subtraction between the reference value and the pixel value of each of the nine sub-pixels G1a, G2a, G3a, G4a, G5a, G6a, G7a, G8a, and G9a. In an exemplary embodiment, because the reference value Gra is identical to the sub-pixel G1a, a result of performing a subtraction operation may be zero (0). Because a residual sub-pixel r1a has zero data, there is no physical meaning. However, the residual sub-pixel r1a may be assumed abstractly. In the same regard, a residual sub-pixel r2a having the sub-pixel value identical to a difference value between the reference value Gra and the pixel value of the sub-pixel G2a may be generated, and a residual sub-pixel r3a having the sub-pixel value identical to a difference value between the reference value Gra and the pixel value of the sub-pixel G3a may be generated. In the same regard, residual sub-pixels r3a, r4a, r5a, r6a, r7a, r8a, and r9a having difference values between the reference value Gra and the pixel values of the sub-pixels G3a, G4a, G5a, G6a, G7a, G8a, and G9a as sub-pixel values may be generated, respectively. The order of a subtraction operation is not limited, as already stated above. The ISP (30 of FIG. 2) may compress an image by generating residual sub-pixels r2a, r3a, r4a, r5a, r6a, r7a, r8a, and r9a, which are difference values between the reference value Gra and the pixel values of sub-pixels, as the bit stream BS instead of transmitting the pixel values of all of the sub-pixels.

It may be understood that the set of the residual sub-pixels r1a, r2a, r3a, r4a, r5a, r6a, r7a, r8a and r9a is a color pixel 135" including green color information. The reference sub-pixel 155" may correspond to the sub-pixel G1a. In an exemplary embodiment, the maximum of the pixel distance Pdistance between the reference sub-pixel 155" and the residual sub-pixels r2a, r3a, r4a, r5a, r6a, r7a, r8a, and r9a may be $2\sqrt{2}$, which is the distance between the reference sub-pixel 155" and a target sub-pixel G9a. Comparing FIG. 6B with FIG. 4B, the pixel distance Pdistance may be reduced from 4 to 1, from 4 to $\sqrt{2}$, from 4 to $\sqrt{5}$, or from 4 to $2\sqrt{2}$. In the same regard, it may be understood that the reduction of the pixel distance Pdistance corresponds to increased spatial similarity.

Referring to FIG. 6C, the camera module 3 (in particular, the encoder 310) may determine any one (the sub-pixel G3a) of the nine sub-pixels G1a, G2a, G3a, G4a, G5a, G6a, G7a, G8a, and G9a included in the color pixel 131 as the reference sub-pixel 155'". The position of a sub-pixel to be determined as the reference sub-pixel may be determined in advance. The position of a sub-pixel determined in advance may be referred to by the encoder 310 and the decoder 510. The reference sub-pixel 155" may be included in the color pixel 131.

The camera module 3 may compare the pixel value of each of the nine sub-pixels G1a, G2a, G3a, G4a, G5a, G6a, G7a, G8a, and G9a with the reference value Gra. In an exemplary embodiment, the camera module 3 may perform subtraction between the reference value Gra and the pixel value of each of the nine sub-pixels G1a, G2a, G3a, G4a, G5a, G6a, G7a, G8a, and G9a. In an exemplary embodiment, because the reference value Gra is identical to the sub-pixel G3a, a result of performing a subtraction operation may be zero (0). Because a residual sub-pixel r3a has zero data, there is no physical meaning. However, the residual sub-pixel r3a may be assumed abstractly. In the same regard, the residual sub-pixel r1a having the sub-pixel value identical to a difference value between the reference value Gra and the pixel value of the sub-pixel G1a may be generated, and the residual sub-pixel r2a having the sub-pixel value identical to a difference value between the reference value Gra and the pixel value of the sub-pixel G2a may be generated. In the same regard, residual sub-pixels r4a, r5a, r6a, r7a, r8a, and r9a having difference values between the reference value Gra and the pixel values of the sub-pixels G4a, G5a, G6a, G7a, G8a, and G9a as sub-pixel values may be generated. The order of a subtraction operation is not limited, as already stated above. The ISP (30 of FIG. 2) may compress an image by generating residual sub-pixels r1a, r2a, r4a, r5a, r6a, r7a, r8a, and r9a, which are difference values between the reference value Gra and the pixel values of sub-pixels, as the bit stream BS instead of transmitting the pixel values of all of the sub-pixels.

It may be understood that the set of the residual sub-pixels r1a, r2a, r3a, r4a, r5a, r6a, r7a, r8a, and r9a is a color pixel 135'" including green color information. A reference sub-pixel 155'" may correspond to the sub-pixel G3a. In an exemplary embodiment, the pixel distance Pdistance between the reference sub-pixel 155'" and the residual sub-pixels r1a, r2a, r3a, r4a, r5a, r6a, r7a, r8a, and r9a may be 1, $\sqrt{2}$, 2, $\sqrt{5}$, or $2\sqrt{2}$. In other words, the maximum of the pixel distance Pdistance between the reference sub-pixel 155'" and the residual sub-pixels r1a, r2a, r3a, r4a, r5a, r6a, r7a, r8a, and r9a may be $2\sqrt{2}$. Comparing FIG. 6C with FIG. 4B, the maximum of the pixel distance Pdistance may be reduced from 4 to $2\sqrt{2}$. In the same regard, it may be understood that the reduction of the pixel distance Pdistance corresponds to increased spatial similarity.

Figure 7A:
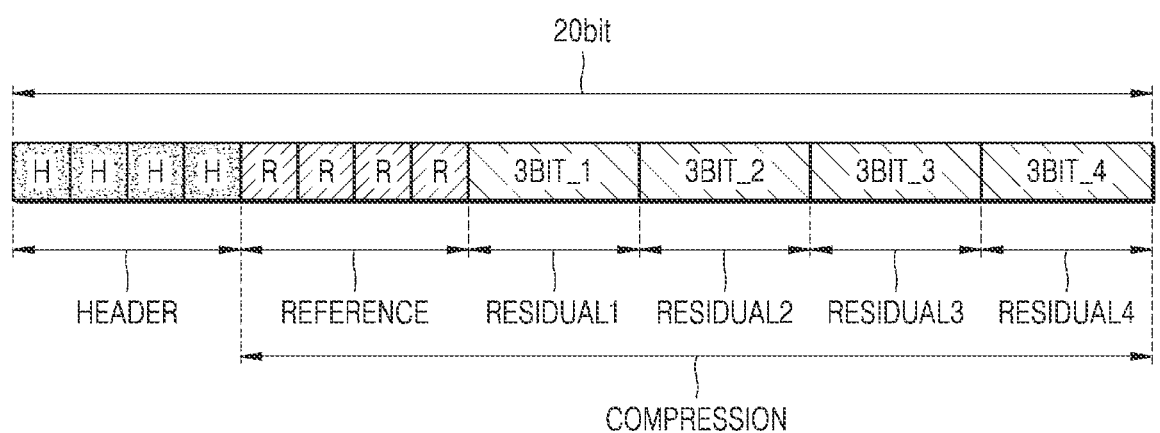
FIGS. 7A and 7B are hybrid schematic diagrams showing one configuration of the bit stream according to an exemplary embodiment.
Figure 7B:
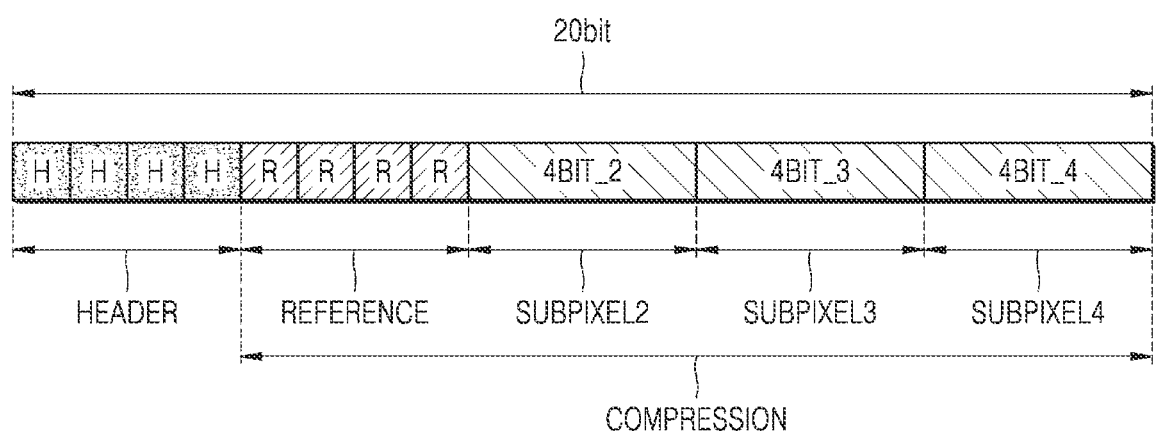

FIGS. 7A and 7B illustrate one configuration of the bit stream BS according to an exemplary embodiment of the present disclosure.

The bit stream BS shown in FIGS. 7A to 7C may be a result of compressing image data corresponding to pixel values generated from the four sub-pixels shown in FIG. 5A. According to an exemplary embodiment, image data corresponding to a pixel value output from one sub-pixel may be 10 bits. Therefore, image data corresponding to a pixel value output from one color pixel (130 of FIG. 3) including four sub-pixels may include a total of 40 bits of data. Although it is exemplified herein that data contained in one sub-pixel is 10 bits for convenience of explanation, the present disclosure is not limited thereto, and one sub-pixel may include various bits of data, e.g., 8 bits, 11 bits, 12 bits, or the like.

The camera module (3 of FIG. 2) may allocate a data space of the bit stream BS to compress 40 bits of data into 20 bits of data. When 40 bits of data is compressed into 20 bits of data, the compression rate thereof is 50%.

FIG. 7A may be the bit stream BS according to a result of the compression of FIG. 5A. Referring to FIG. 7A together with FIG. 5A, according to an exemplary embodiment, 4 bits may be allocated to header information. The header information may be a set of bits generated by encoding compression information regarding a compression method (e.g., information regarding a compression algorithm such as a DPCM method and a PCM method). As a result of allocating 4 bits for the header information, $2^4$ (=16) pieces of compressed information may be transmitted through the header information. According to an exemplary embodiment, the decoder 510 may refer to a compression method applied to sub-pixels through the header information and decode the bit stream BS by using the same compression method.

According to an exemplary embodiment, the camera module (3 of FIG. 2) may determine an average pixel value of the sub-pixels 151, which are reference sub-pixels, as the reference value Gra (i.e., the virtually existing reference sub-pixel 151'). The sub-pixel 151' may be a comparison criterion for compressing data.

According to an exemplary embodiment, 4 bits may be allocated for the reference value Gra (i.e., the pixel value of the virtually existing reference sub-pixel 151'). Because the reference sub-pixel 151' is the average of sub-pixels each containing 10 bits of data, the reference sub-pixel 151' may contain a pixel value of 10 bits. However, because only a data space of 4 bits is allocated, the data space may be insufficient. To solve the insufficiency of the data space, the encoder (310 of FIG. 2) may remove a portion of data of the reference sub-pixel 151'. According to an exemplary embodiment, the encoder 310 may remove the lower 6 bits from among the 10 bits of the reference sub-pixel 151' and include only the upper 4 bits in the bit stream BS. Data of a sub-pixel to be removed is not limited thereto, and an arbitrary number of lower bits may be removed according to demanded performances (a compression rate, a data loss rate, power, or the like).

According to an exemplary embodiment, 3 bits may be allocated for one residual sub-pixel. One color pixel 131' may include four residual sub-pixels, and a space of a total 12 bits 3bit_1, 3bit_2, 3bit_3, and 3bit_4 may be allocated for the four residual sub-pixels in the bit stream BS for transmitting data regarding the one color pixel 131'. Because the pixel value of a residual sub-pixel is a difference between the reference value Gra and the pixel value of the sub-pixel 151, a space of 3 bits, which is smaller than 4 bits, may be allocated as a space for the residual sub-pixel.

As a result, 40 bits for four sub-pixels may be compressed to 16 bits. When the 4 bits allocated for the header information including compression information is added, 40 bits may be compressed to 20 bits, and a compression rate of 50% may be achieved. Although it is assumed that the size of compressed data is 20 bits for convenience of explanation, the present disclosure is not limited thereto, and data may be compressed to various sizes such as 10 bits (compression rate of 75%) and 30 bits (compression rate of 25%) according to demanded performances (a compression rate, a data loss rate, power, or the like).

FIG. 7B will be referred to together with FIG. 5B. According to an exemplary embodiment, the camera module 3 may determine the sub-pixel G1a having a median value of the sub-pixels 151 as the reference sub-pixel 151" or determine any one pre-determined sub-pixel (the sub-pixel G2a) from among the sub-pixels 151 as the reference sub-pixel 151'''.

According to an exemplary embodiment, 4 bits may be allocated for the reference sub-pixel 151" or 151'''. Although the reference sub-pixel 151" or 151''' may include a pixel value of 10 bits, a data space allocated for the same is only 4 bits, and thus, the data space may be insufficient. To solve the insufficiency of the data space, the encoder 310 may remove a portion of data of the reference sub-pixel 151" or 151'''. According to an exemplary embodiment, the encoder 310 may remove the lower 6 bits from among the 10 bits of the reference sub-pixel 151" or 151''' and include only the upper 4 bits in the bit stream BS. Data of a sub-pixel to be removed is not limited thereto, as described above.

According to an exemplary embodiment, 4 bits may be allocated for the remaining sub-pixels other than the pixel determined as the reference sub-pixel 151" or 151'. One color pixel 131" or 131''' may include four sub-pixels, and, in the bit stream BS for transmitting data regarding the one color pixel 131" or 131''', a space of a total 12 bits 4bit_2, 4bit_3, and 4bit_4 may be allocated for the remaining three sub-pixels other than the reference sub-pixel 151" or 151'''.

As a result, 40 bits for four sub-pixels may be compressed to 16 bits. When the 4 bits allocated for the header information including compression information is added, 40 bits may be compressed to 20 bits, and a compression rate of 50% may be achieved, as described above.

Figure 8:
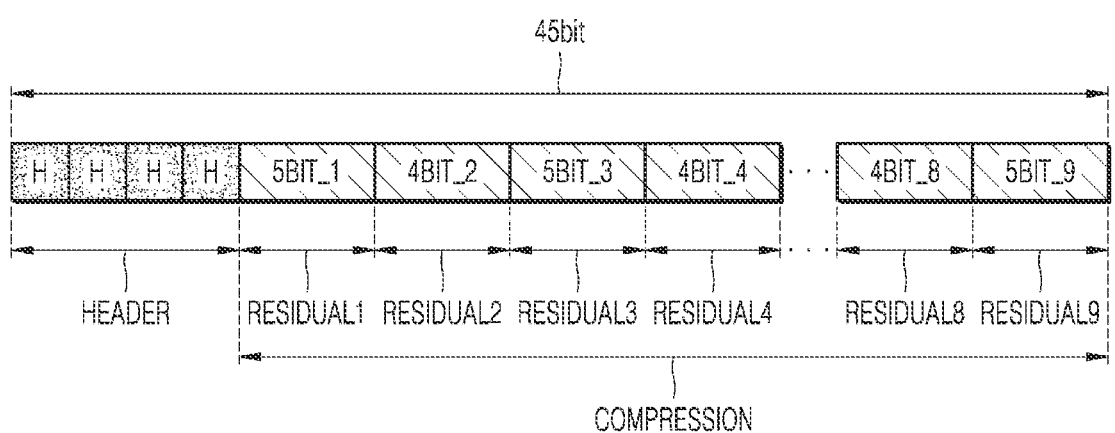
FIG. 8 is a hybrid schematic diagram showing another configuration of the bit stream according to an exemplary embodiment.

FIG. 8 illustrates a configuration of the bit stream BS according to an exemplary embodiment of the present disclosure. FIGS. 2, 4B and 6B will be referred to together with FIG. 8.

The bit stream BS shown in FIG. 8 may be associated with data included in nine sub-pixels shown in FIG. 8B. According to an exemplary embodiment, one sub-pixel may include 10 bits of data. One color pixel (135 of FIG. 6B) including nine sub-pixels may include a total of 90 bits of data. The present disclosure may be related to a method of compressing 90-bit data included in the nine sub-pixels. Although it is exemplified herein that data contained in one sub-pixel is 10 bits for convenience of explanation, the present disclosure is not limited thereto, and one sub-pixel may include various bits of data, e.g., 8 bits, 11 bits, 12 bits, or the like.

The camera module (3 of FIG. 2) may allocate a data space of the bit stream BS to compress 90 bits of data into 45 bits of data. When 90 bits of data is compressed into 45 bits of data, the compression rate thereof is 50%.

As described above, according to an exemplary embodiment, 4 bits may be allocated for header information, and the header information may be a set of bits generated by encoding compression information including a compression method.

The camera module 3 may determine the sub-pixel G1a having a median value of the sub-pixels 155 as the reference sub-pixel 155" or determine any one pre-determined sub-pixel (the sub-pixel G2a) from among the sub-pixels 151 as the reference sub-pixel 155'''. According to an exemplary embodiment, 5 bits may be allocated for the reference sub-pixel 155" or 155'''. Although the reference sub-pixel 155" or 155''' may include a pixel value of 10 bits, a data space allocated for the same is only 4 bits, and thus, the data space may be insufficient. To solve the insufficiency of the data space, the encoder 310 may remove a portion of data of the reference sub-pixel 155" or 155'''. According to an exemplary embodiment, the encoder 310 may remove the lower 5 bits from among the 10 bits of the reference sub-pixel 155" or 155''' and include only the upper 5 bits in the bit stream BS. Data of a sub-pixel to be removed is not limited thereto, as described above.

According to an exemplary embodiment, 5 bits may be allocated for the remaining sub-pixels other than the pixel determined as the reference sub-pixel 155" or 155'''. One color pixel 135" or 135''' may include nine sub-pixels, and, in the bit stream BS for transmitting data regarding the one color pixel 135" or 135''', a space of a total 40 bits may be allocated for the remaining eight sub-pixels other than the reference sub-pixel 155" or 155'''. According to an exemplary embodiment, when a fifth sub-pixel G5b is determined as the reference sub-pixel 155" or 155''', a first residual sub-pixel r1a may be generated as a result of a subtraction operation between the reference value Gra and a first sub-pixel G1a. At this time, 5 bits may be allocated for the first residual sub-pixel r1a. A second residual sub-pixel r2a may be generated as a result of a subtraction operation between the reference value Gra and a second sub-pixel G2a, and 4 bits may be allocated for the second residual sub-pixel r2a. Alternately, 5 bits may be allocated for a third residual sub-pixel E3a and 4 bits may be allocated for a fourth residual sub-pixel r4a, and repeatedly, 4 bits may be allocated for an eighth residual sub-pixel r8a and 5 bits may be allocated for a ninth residual sub-pixel r9a.

As a result, 90 bits for nine sub-pixels may be compressed to 41 bits. When the 4 bits allocated for the header information including compression information is added, 90 bits may be compressed to 45 bits, and a compression rate of 50% may be achieved, as described above.

Figure 9:
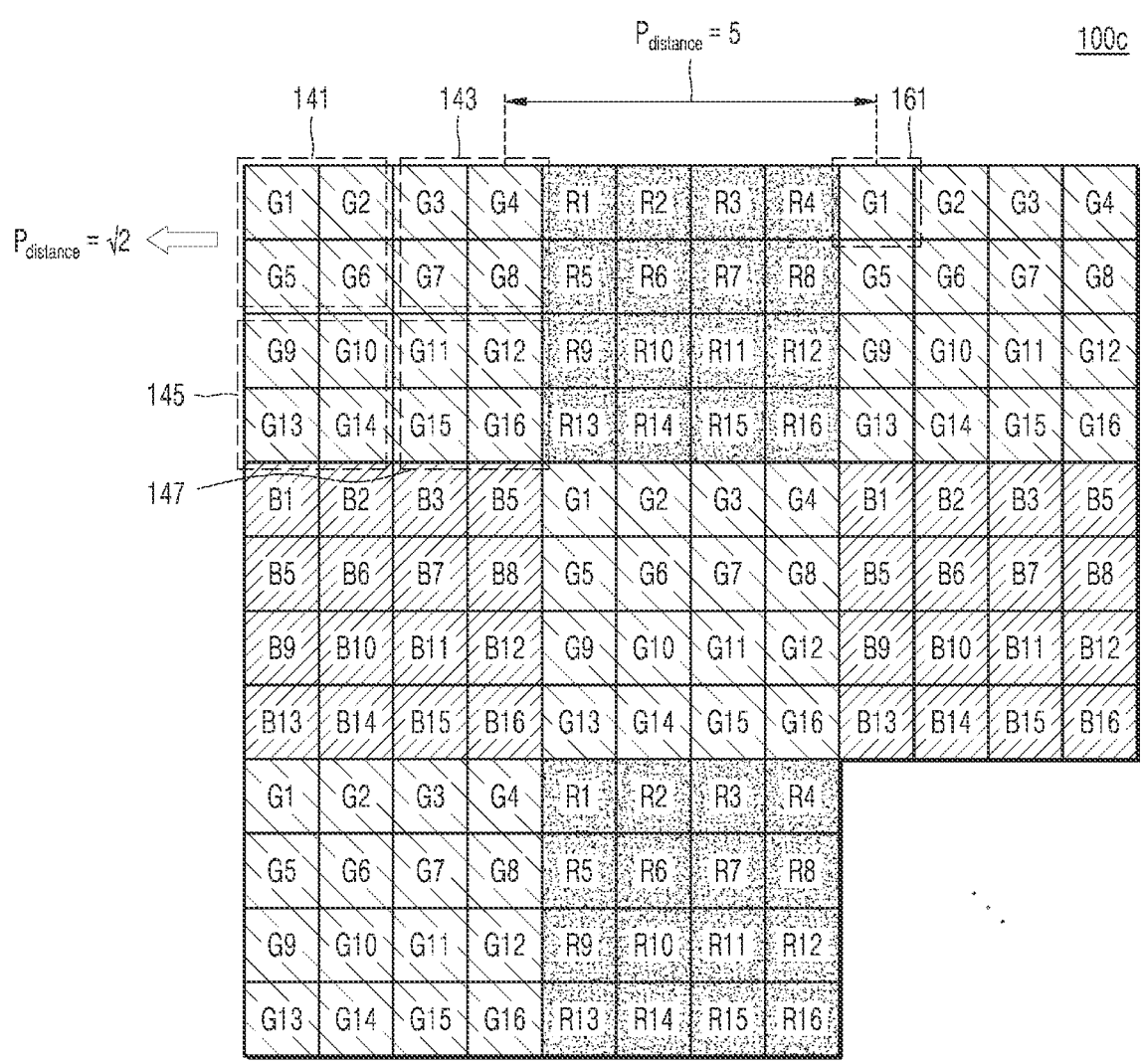
FIG. 9 is a schematic diagram showing a pixel array according to an exemplary embodiment.

FIG. 9 illustrates a pixel array 100c according to another exemplary embodiment of the present disclosure.

It is assumed that the sub-pixels 150 are arranged in a 4×4 matrix in the pixel array 100c. When the number of sub-pixels is 16, a cell including the same may be referred to as a hexadeca cell.

In an alternate embodiment, a pixel array may be configured as a hybrid octa-tetra cell layout, such as with the green color pixels having sub-pixels arranged as an octa cell, and the red and blue color pixels having sub-pixels arranged as alternating tetra cells. In this case, the pixel distance Pdistance may be different for octa cells (e.g., green sub-pixels) versus tetra cells (e.g., red and blue sub-pixels).

To compress one sub-pixel 161 (i.e., a target sub-pixel) in a first row of the pixel array 100c, the camera module (3 of FIG. 2) may search for a reference sub-pixel including substantially the same color information. A pixel having substantially the same color information as the target sub-pixel 161 and is closest to the target sub-pixel 161 may be determined as a reference sub-pixel 141. The reference sub-pixel 141 may be the pixel closest to the target sub-pixel 161.

Because the target sub-pixel 161 is surrounded by red pixels and blue pixels, the distance between the target sub-pixel 161 and the reference sub-pixel 141 may additionally include 4, which is the width of one color pixel. As a result, the pixel distance Pdistance between the target sub-pixel 161 and the reference sub-pixel 141 may also be 5.

A 4×4 matrix arrangement may be divided into a plurality of 2×2 matrices. According to an exemplary embodiment, a 4×4 matrix array may be divided into a first partial color pixel 141, a second partial color pixel 143, a third partial color pixel 145, and a fourth partial color pixel 147.

A plurality of partial color pixels 141, 143, 145, and 147, which are 2×2 matrices, may be compressed in a similar manner as the sub-pixels arranged 2×2 matrices described above in FIGS. 5A to 5C. As a result, the pixel distance of the 4×4 matrix array pixel array 100c may be √2, and the spatial similarity may be higher than a case where the pixel distance is 5.

In a similar manner, a P×P matrix arrangement may be divided into a plurality of Q×Q matrix arrangements (where P is a non-prime natural number of 4 or greater, Q is a natural number of 2 or greater, and P>Q).

Figure 10:
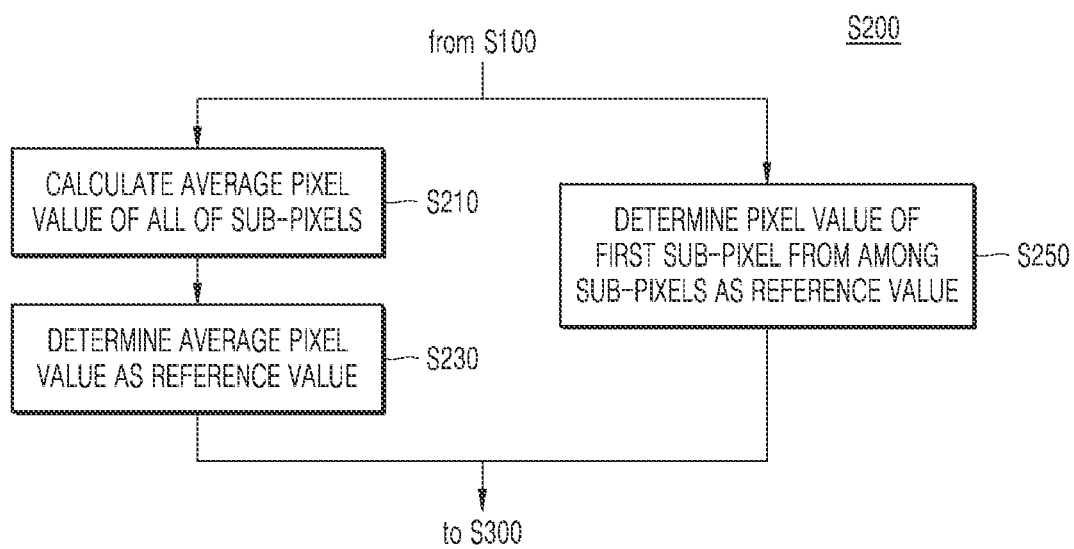

FIGS. 10 and 11 illustrate an image compression method according to an exemplary embodiment of the present disclosure.

FIG. 10 will be referred to together with FIGS. 2, 5A to 5C, and 6A to 6C.

In operation S200 after operation S100, a camera module (e.g., the camera module 3 of FIG. 2) may determine the reference value Gra based on pixel values of a plurality of sub-pixels (operation S200).

In detail, a case in which the reference value is determined by an average value of the sub-pixels and a case in which the reference value is determined by the pixel value of any one of the sub-pixels may be distinguished.

In operation S230, when the reference value is determined by the average value of the sub-pixels, an encoder (310 of FIG. 2) may calculate the average pixel value of all of the sub-pixels (i.e., a virtual sub-pixel 151' or 155') (operation S210). The encoder 310 may determine a calculated average value as the reference value Gra (operation S230).

In operation S250, when the reference value is determined by the pixel value of any one of the sub-pixels, the encoder 310 may determine the pixel value of a first sub-pixel 151", 151''', 155", or 155''' from among the sub-pixels as the reference value (operation S250).

When the reference value is determined, the method may proceed to operation S300 for comparing the pixel values of the sub-pixels with the reference value.

FIG. 11 will be referred to together with FIGS. 2, 5A to 5C, and 6A to 6C, and duplicate description may be omitted. FIG. 11 illustrates an operation in which, when the reference value is determined by the pixel value of any one of the sub-pixels, the encoder 310 determines the pixel value of a first sub-pixel 151", 151''', 155", or 155''' from among the sub-pixels as the reference value.

In detail, the case shown in FIG. 11 may be divided into a case where a median is used and a case where a sub-pixel at a pre-determined position is used.

In operation S251, in case where a median is used, the encoder 310 may sort pixel values of the sub-pixels according to the sizes thereof.

Thereafter, in operation S253, the encoder 310 may determine whether the number of sub-pixels is an odd number or an even number.

In operation S255, when the number of sub-pixels is an even number, a sub-pixel having the median of the pixel values may be identified. For example, when there are nine sub-pixels, the fifth largest (i.e., the fifth smallest) sub-pixel from among the nine sub-pixel values may be identified.

In operation S255, when the number of sub-pixels is an odd number, a sub-pixel having a smaller value of two medians of sorted pixel values may be identified. However, the present disclosure is not limited thereto, and a larger value of the two medians may be determined as a reference value according to the design concept of the encoder 310.

In operation S259, the encoder 310 may determine the identified sub-pixel as a first sub-pixel, and the pixel value of the determined first sub-pixel may be used as the reference value.

In operation S252, in case where a sub-pixel at a pre-determined location is used, the encoder 310 may determine the sub-pixel at the pre-determined location among the sub-pixels as the first sub-pixel.

Figure 12A:
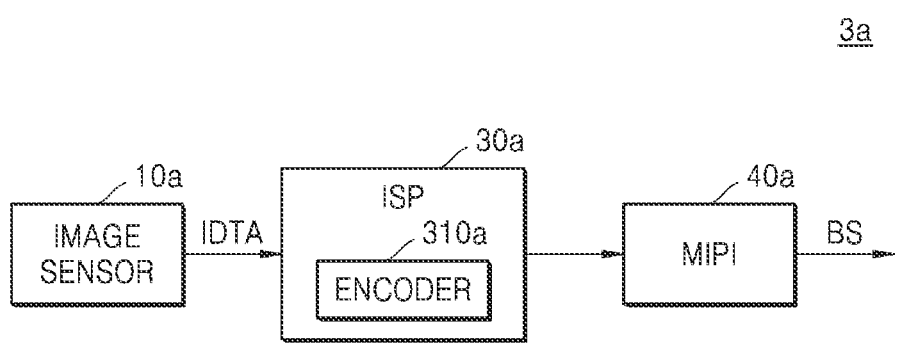
FIGS. 12A and 12B are block diagrams showing camera modules according to an exemplary embodiment.
Figure 12B:
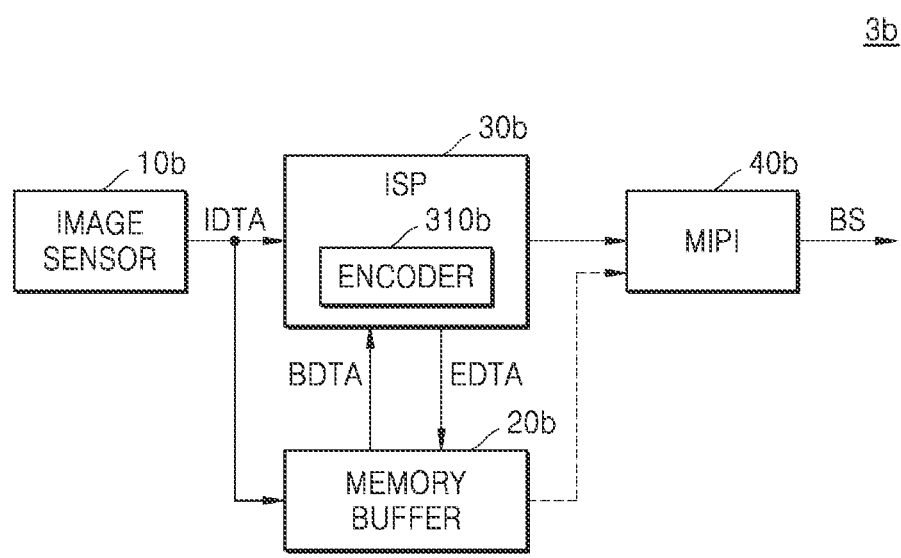

FIGS. 12A and 12B illustrate camera modules 3a and 3b according to an exemplary embodiment of the present disclosure.

Referring to FIG. 12A, a camera module 3a may include an image sensor 10a, an ISP 30a, and a Mobile Industry Processor Interface (MIPI) interface 40a. The ISP 30a may include an encoder 310a.

The image sensor 10a may provide image data IDTA to the ISP 30a as a result of optically sensing an object. The ISP 30a may transmit the bit stream BS through the MIPI interface 40a. According to an exemplary embodiment, the bit stream BS may be provided to the AP 50a.

The MIPI interface 40a may interface between the ISP 30a and the AP 50a. In detail, the MIPI interface 40a may refer to a physical protocol or specification that facilitates data and/or signal transmission between the ISP 30a and the AP 50a having different specifications and configurations. The MIPI interface 40a may employ an arbitrary channel specification determined by a product manufacturers' organization, such as a MIPI Alliance interface, which is a common interface specification set forth by mobile device manufacturers. However, the present disclosure is not limited thereto, and there may be various arbitrary signal input/output protocols implemented instead of or in addition to such a MIPI interface.

Although FIG. 12A shows that the MIPI interface 40a is included in the camera module 30a, due to the nature of an interfacing device, it may be understood that the MIPI interface 40*a* is also included in the AP 50*a* for reception of the bit stream (BS).

Referring to FIG. 12B, a camera module 3*b* may include an image sensor 10*b*, an ISP 30*b*, and a MIPI interface 40*b*, and the ISP 30*b* may include an encoder 310*b*. The camera module 3*b* may further include a memory buffer 20*b*. Because the image sensor 10*b*, the ISP 30*b*, and the MIPI interface 40*b* are similar to the image sensor 10*a*, the ISP 30*a*, and the MIPI interface 40*a* of FIG. 12A, descriptions identical to those already given above may be omitted.

The memory buffer 20*b* may function as a buffer that receives the image data IDTA and temporarily stores at least a portion of the image data IDTA.

According to an exemplary embodiment, the memory buffer 20*b* may buffer data corresponding to a first row of the image data IDTA. The sub-pixels may be arranged in a matrix form, and the encoder 310*b* may compress data only after the entire pixel information of a color pixel including sub-pixels is provided, and thus, the data corresponding to the first row of the image data IDTA need not be processed immediately.

When data corresponding to a second row of the image data IDTA is provided, the ISP 30*b* may load buffered image data BDTA for the first row to the memory buffer 20*b*. The encoder 310*b* may compress data corresponding to the color pixel based on the loaded buffered image data BDTA and provided data corresponding to the second row. Encoded image data EDTA, which is compressed data, may be stored in the memory buffer 20*b*.

The bit stream BS generated as a result of the compression may be provided to the MIPI interface 40*b*. Data generated as a result of encoding may be provided directly from the ISP 30*b* to the MIPI interface 40*b* or may be provided from the memory buffer 20*b* to the MIPI interface 40*b* based on the encoding image data EDTA stored in the memory buffer 20*b*.

The camera module 3*b* may buffer the data corresponding to the first row of the image data IDTA without immediately processing the same and, when reading the data corresponding to the second row of the image data IDTA, compress the data corresponding to the first row of the image data IDTA and the data corresponding to the second row of the image data IDTA at once, and thus, the speed for compressing the image data IDTA may be improved. Moreover, because there are rows that are not immediately compressed and buffered, power consumption may be reduced as compared to a case of compressing all rows.

The memory buffer 20*b* may be implemented with a volatile memory or a non-volatile memory. The volatile memory may include a dynamic random access memory (DRAM), a static RAM (SRAM), or the like, whereas the non-volatile memory may include a read only memory (ROM), a programmable ROM (PROM), an electrically erasable and programmable ROM (EEPROM), a flash memory, a phase-change RAM (PRAM), a magnetic RAM (MRAM), a resistive RAM (RRAM), a ferroelectric RAM (FRAM), or the like.

The structure in which the image sensor 10*b*, the ISP 30*b*, and the memory buffer 20*b* are included in the camera module 3*b* may be referred to as a 3-stacked-layer.

Figure 13:
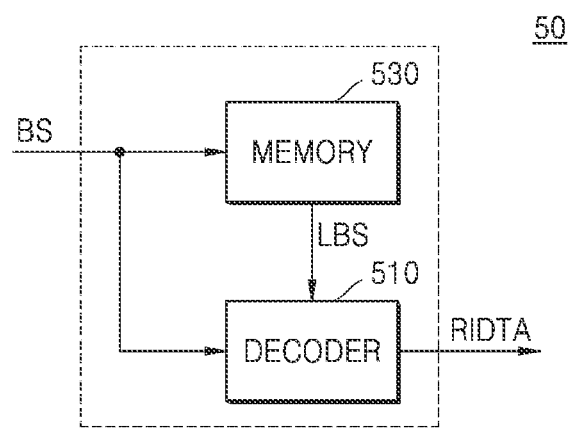
FIG. 13 is a block diagram showing an application processor (AP) according to an exemplary embodiment.

FIG. 13 illustrates the AP 50 according to an exemplary embodiment of the present disclosure.

The AP 50 may include a memory 530 in addition to the decoder 510.

The memory 530 may be implemented with a volatile memory or a non-volatile memory. The volatile memory may include a dynamic random access memory (DRAM), a static RAM (SRAM), or the like, whereas the non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), or the like.

The AP 50 may temporarily store provided bit streams BS in the memory 530. Moreover, the AP 50 may directly provide the bit streams BS to the decoder 510.

According to an exemplary embodiment, from among the bit streams BS, a bit stream corresponding to the first row of the image data IDTA may be stored in the memory 530, and a bit stream BS corresponding to the second row of the image data may be provided to the decoder 510.

When the decoder 510 processes the bit stream corresponding to the second row of the image data IDTA from among the bit streams BS, a bit stream LBS corresponding to the first row, which is stored in the memory 530, may be loaded.

The AP 50 may buffer the data corresponding to the first row of the image data IDTA without immediately decoding the same and, when decoding the data corresponding to the second row of the image data IDTA, decode the data corresponding to the first row of the image data IDTA and the data corresponding to the second row of the image data IDTA at once, and thus, the speed for decoding the image data IDTA may be improved.

Figure 14:
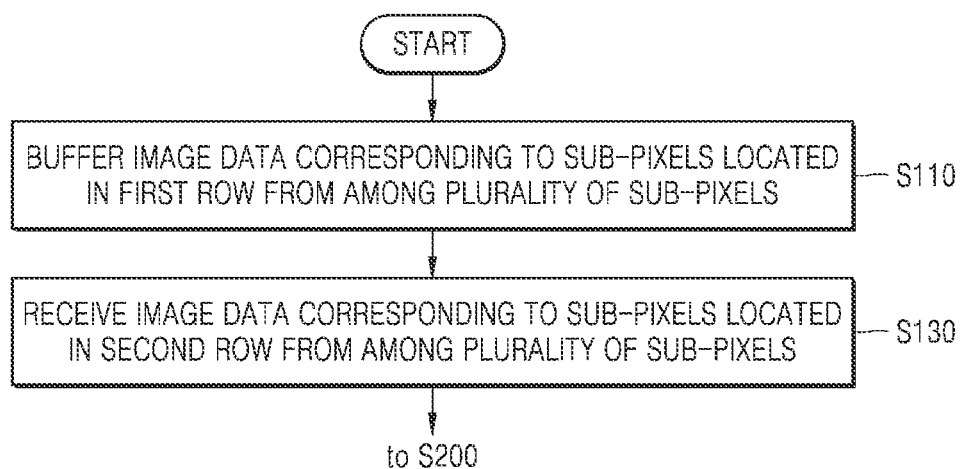
FIG. 14 is a flowchart diagram of an image compression method according to an exemplary embodiment.

FIG. 14 illustrates an image compression method according to an exemplary embodiment of the present disclosure.

Operation S100 for categorizing a plurality of sub-pixels including first color information into a first color pixel may be subdivided.

The values of sub-pixels located in a first row from among the sub-pixels may be buffered (operation S110). Thereafter, the values of sub-pixels located in a second row from among the sub-pixels may be read (operation S130), and, based on the values of sub-pixels located in the second row and the buffered values of the sub-pixels located in the first row, the image data IDTA may be compressed.

Thereafter, the method may proceed to operation S200 for determining a reference value based on the sub-pixels.

Figure 15A:
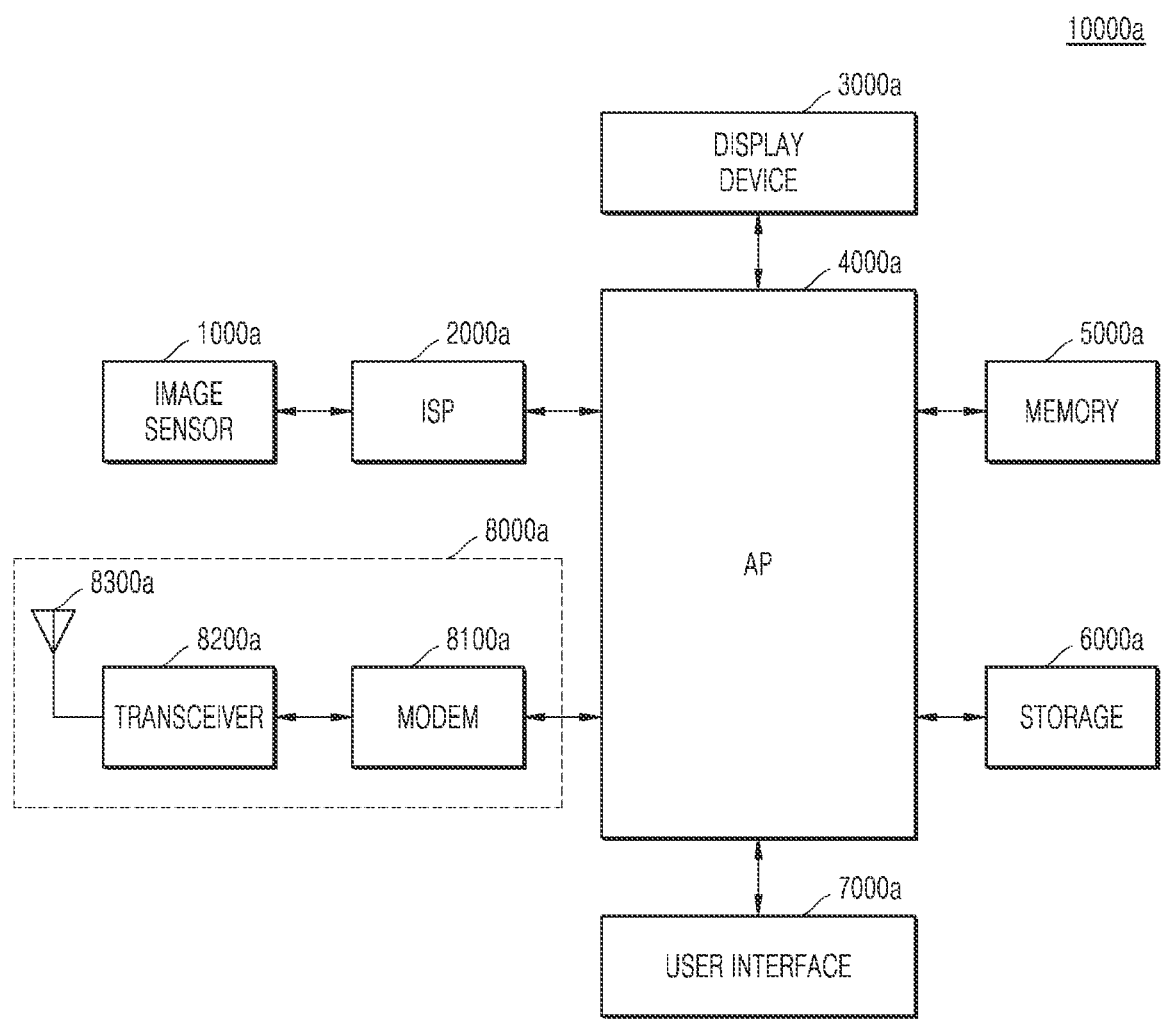
FIGS. 15A and 15B are block diagrams showing electronic devices according to an exemplary embodiment.
Figure 15B:
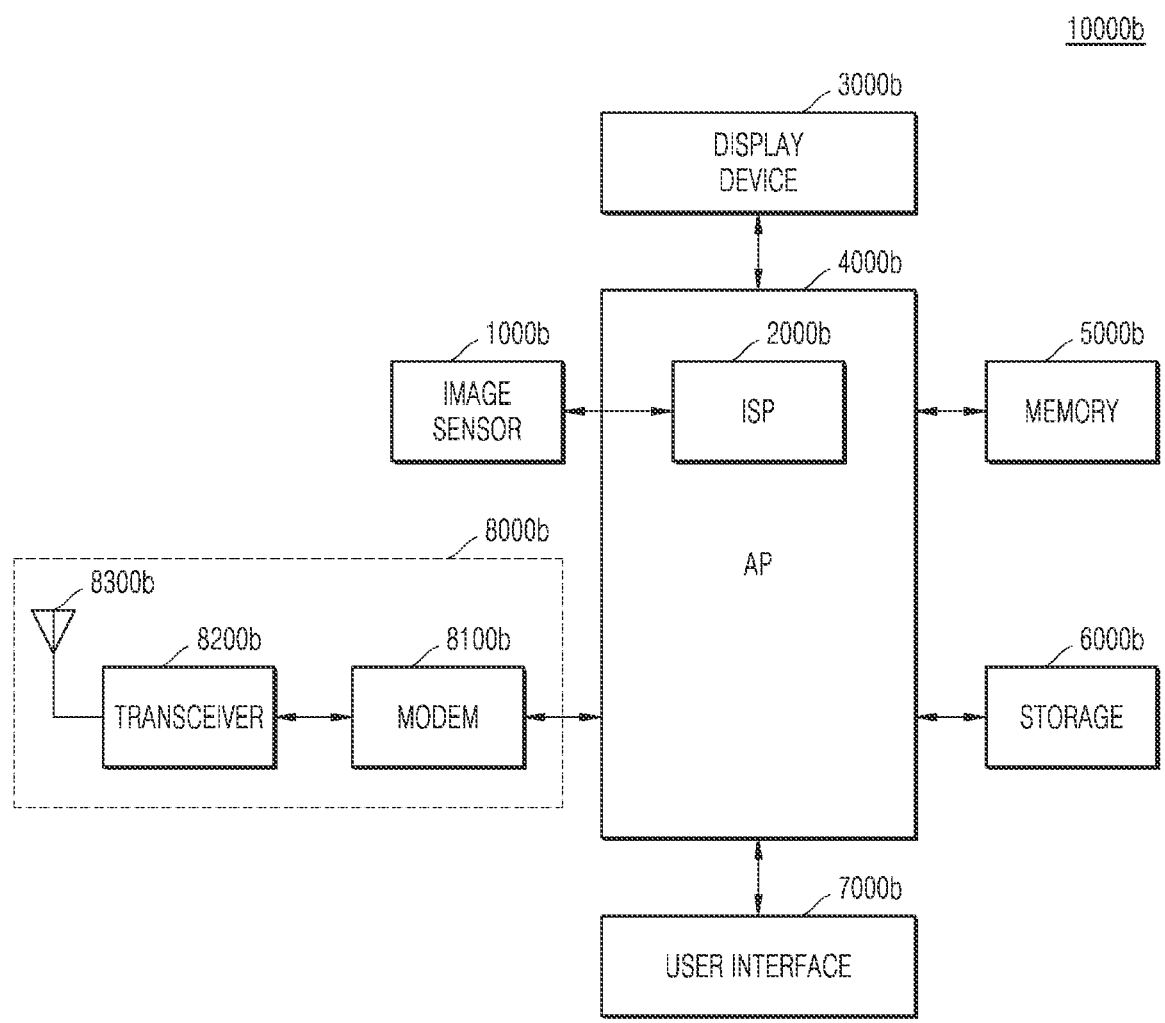

FIGS. 15A and 15B illustrate electronic devices 10000*a* and 10000*b* according to an exemplary embodiment of the present disclosure.

Referring to FIG. 15A, an electronic device 10000*a* according to an exemplary embodiment of the present disclosure may include an image sensor 1000*a*, an ISP 2000*a*, a display device 3000*a*, an AP 4000*a*, a working memory 5000*a*, a storage 6000*a*, a user interface 7000*a*, and a wireless transceiver 8000*a*, wherein the ISP 2000*a* may be implemented as a separate integrated circuit from the AP 4000*a*. The image sensor 10 of FIG. 2 may operate as the image sensor 1000*a* of FIG. 15A, and the ISP 30 of FIG. 2 may be applied as the ISP 2000*a* of FIG. 15A.

The image sensor 1000*a* may generate image data, such as raw image data, based on a received optical signal and provide binary data to the ISP 2000*a*. The AP 4000*a* controls the overall operation of the electronic device 10000*a* and may be provided as a system-on-chip (SoC) that drives an application program, an operating system, or the like. The AP 4000*a* may control the operation of the ISP 2000*a* and provide converted image data generated by the ISP 2000a to the display device 3000a or store the converted image data in the storage 6000a.

The memory 5000a may store programs and/or data processed or executed by the AP 4000a. The storage 6000a may be implemented with a non-volatile memory device such as a NAND flash or a resistive memory. For example, the storage 6000a may be provided as a memory card (an MMC, an eMMC, an SD, a micro SD, or the like). The storage 6000a may store data and/or programs regarding an execution algorithm that controls an image processing operation of the ISP 2000a, and, when an image processing operation is performed, the data and/or the programs may be loaded to the working memory 5000a.

The user interface 7000a may be implemented with various devices capable of receiving user inputs, e.g., a keyboard, a curtain key panel, a touch panel, a fingerprint sensor, a microphone, or the like. The user interface 7000a may receive a user input and provide a signal corresponding to the received user input to the AP 4000a. The wireless transceiver 8000a may include a modem 8100a, a transceiver 8200a, and an antenna 8300a.

Referring to FIG. 15B, an electronic device 10000b according to an exemplary embodiment of the present disclosure may include an image sensor 1000b, an ISP 2000b, a display device 3000b, an AP 4000b, a working memory 5000b, a storage 6000b, a user interface 7000b, and a wireless transceiver 8000b, wherein the image sensor 10 of FIG. 2 may operate as the image sensor 1000b of FIG. 15B, and the ISP 30 of FIG. 2 may be applied as the ISP 2000b of FIG. 15B.

The AP 4000b may include the ISP 2000b. The ISP 2000b may be provided as a sub-component of the AP 4000b without being configured as separate hardware or a combination of hardware and software. The other components of FIG. 15B are similar to those of FIG. 15A, and thus descriptions identical to those already given above may be omitted.

Figure 16:
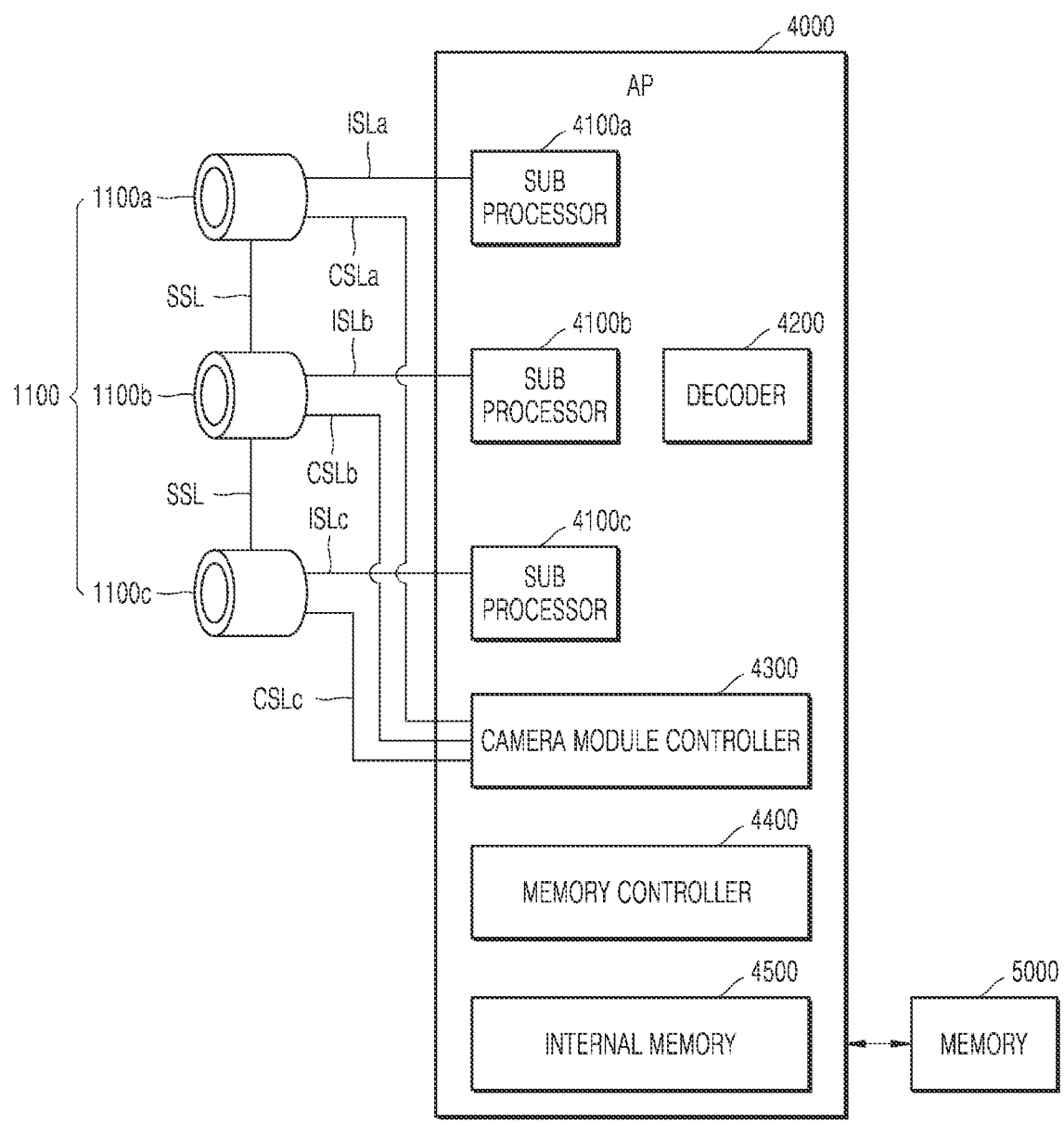
FIG. 16 is a diagram showing a portion of an electronic device according to an exemplary embodiment.
Figure 17:
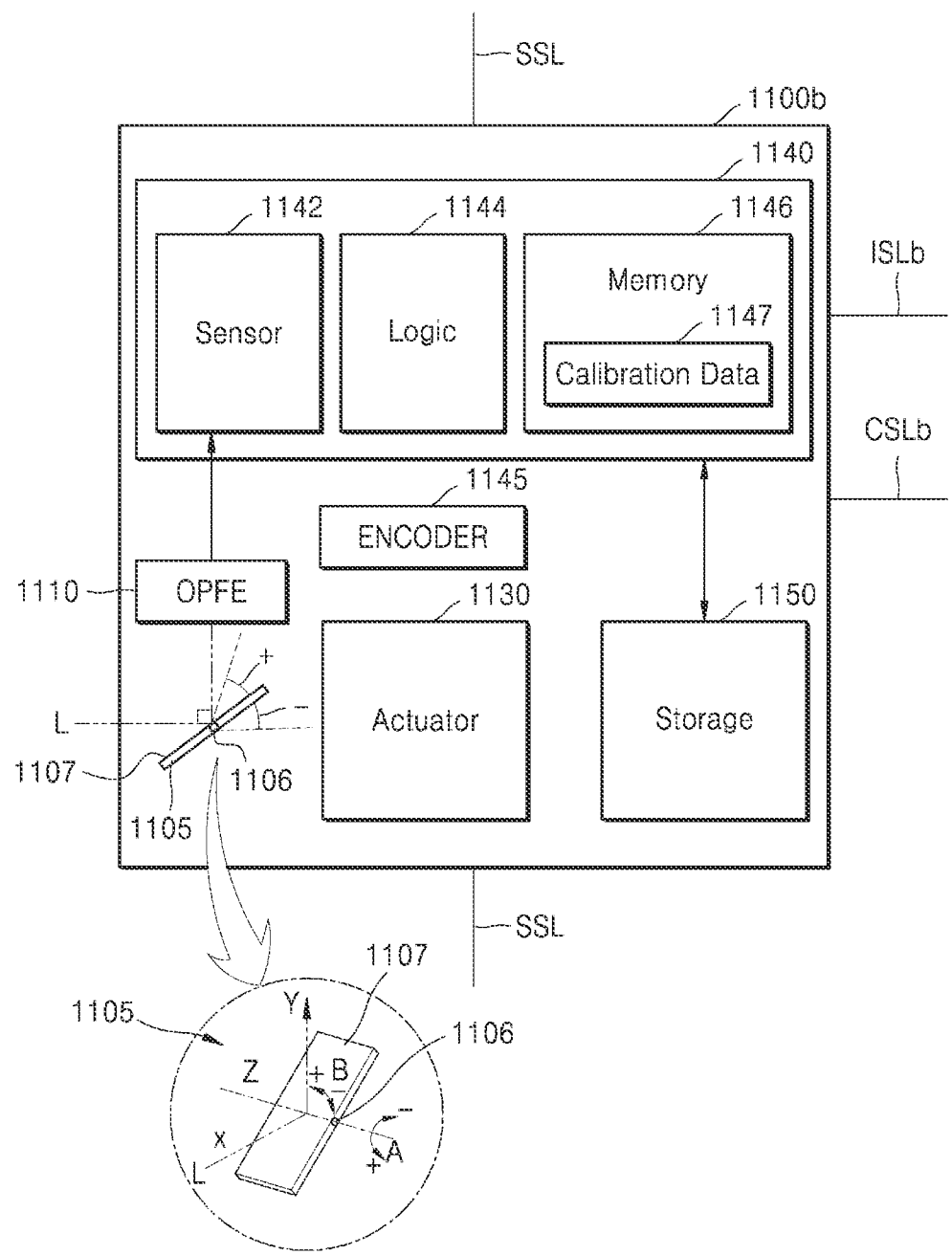
FIG. 17 is a detailed block diagram of a camera module according to an exemplary embodiment.

FIG. 16 illustrates a portion of an electronic device according to an exemplary embodiment of the present disclosure. FIG. 17 illustrates the camera module of FIG. 16. Although FIG. 16 shows a portion of the electronic device 10000a shown in FIG. 15A or the electronic device 10000b shown in FIG. 15B as an electronic device 20000 for convenience of explanation, components of FIG. 15A or 15B omitted in FIG. 16 may be included in the electronic device 20000 and, as an integrated body, implement the present disclosure.

Referring to FIG. 16, the electronic device 20000 may include a multi camera module 1100, an AP 4000, and a memory 5000. The memory 5000 may perform the same function as the memory 5000a shown in FIG. 15A or the memory 5000b shown in FIG. 15B, descriptions identical to those already given above may be omitted.

The electronic device 20000 may capture and/or store an image of an object by using a CMOS image sensor, and may be implemented as a mobile phone, a tablet computer, or a portable electronic device. The portable electronic device may include a laptop computer, a mobile phone, a smartphone, a tablet PC, a wearable device, or the like. The electronic device 20000 may include one or more camera modules and an AP that processes image data generated by the one or more camera modules.

The multi camera module 1100 may include a first camera module 1100a, a second camera module 1100b, and a third camera module 1100c. The multi camera module 1100 may perform the same function as the camera module 3 of FIG. 2. Although three camera modules 1100a to 1100c are shown for convenience of explanation, the present disclosure is not limited thereto, and various numbers of camera modules may be included in the multi camera module 1100.

Hereinafter, the detailed configuration of the second camera module 1100b will be described in more detail with reference to FIG. 17, but the following description may also be applied to the other camera modules 1100a and 1100c according to embodiments.

Referring to FIG. 17, the second camera module 1100b may include a prism 1105, an optical path folding element (hereinafter, "OPFE") 1110, an actuator 1130, an image sensing device 1140, and a storage 1150.

The prism 1105 may include a reflective surface 1107 of a light reflecting material to modify the path of light L incident from the outside.

According to an exemplary embodiment, the prism 1105 may change the path of light L incident in the first direction X to the second direction Y perpendicular to the first direction X. Moreover, the prism 1105 may rotate the reflective surface 1107 of the light reflecting material in an A direction or a B direction around a center axis 1106, thereby changing the path of the light L incident in the first direction X to the second direction Y perpendicular to the first direction X. At this time, the OPFE 1110 may also move in a third direction Z perpendicular to the first direction X and second direction Y.

In the exemplary embodiment, as shown in FIG. 17, the maximum rotatable angle of the prism 1105 in the direction A may be less than or equal to 15 degrees in the positive (+) A direction and may be greater than 15 degrees in the negative (−) A direction. However, embodiments are not limited thereto.

In an exemplary embodiment, prism 1105 may be rotated by around 20 degrees, between 10 degrees and 20 degrees, or between 15 degrees and 20 degrees in the positive (+) or negative (−) B direction. Here, the prism 1105 may be rotated by the same angle or similar angles that are different from each other by around 1 degree in the positive (+) B direction and the negative (−) B direction.

In an exemplary embodiment, the prism 1105 may move the reflective surface 1106 of the light reflecting material in the third direction (e.g., a Z direction) parallel to the direction in which the center axis 1106 extends.

For example, the OPFE 1110 may include optical lenses including m (where m is a natural number) groups. m lenses may move in the second direction Y and change the optical zoom ratio of the camera module 1100b. For example, when the basic optical zoom ratio of the camera module 1100b is Z and the m optical lenses included in the OPFE 1110 are moved, the optical zoom ratio of the camera module 1100b may be changed to 3Z, 5Z, or an optical zoom ratio higher than 5Z.

The actuator 1130 may move the OPFE 1110 or optical lenses (hereinafter referred to as an optical lens) to a particular position. For example, the actuator 1130 may adjust the position of the optical lens, such that the image sensor 1142 is positioned at the focal length of the optical lens for accurate sensing.

The image sensing device 1140 may include an image sensor 1142, a control logic 1144, an encoder 1145 and a memory 1146. The image sensor 1142 may sense an image of a sensing target by using the light L provided through the optical lens. Because the image sensor 1142 of FIG. 17 may be functionally similar to the image sensor 10 of FIG. 2, descriptions identical to those already given above may be omitted. The control logic 1144 may control the overall operation of the second camera module 1100b. For example, the control logic 1144 may control the operation of the second camera module 1100b according to a control signal provided through a control signal line CSLb.

The encoder 1145 may encode sensed image data. Because the encoder 1145 of FIG. 17 may perform a function similar to that of the encoder 310 of FIG. 2, descriptions identical to those already given above may be omitted. Unlike the encoder 310 shown in FIG. 2, the encoder 1145 shown in FIG. 17 may not be included in an ISP (30 in FIG. 2) and may be included in a camera module (e.g., 1100b). Although the encoder 1145 is shown as an individual functional unit separate from the other functional units for convenience of explanation, the present disclosure is not limited thereto, and the encoder 1145 may be included in the control logic 1144 to compress and encode image data.

The memory 1146 may store information necessary for the operation of the second camera module 1100b, e.g., calibration data 1147. The calibration data 1147 may include information necessary for the second camera module 1100b to generate image data by using the light L provided from the outside. The calibration data 1147 may include, for example, information about a degree of rotation described above, information about a focal length, information about an optical axis, or the like. When the second camera module 1100b is implemented in the form of a multi-state camera in which the focal length is changed depending on the position of the optical lens, the calibration data 1147 may include focal distance values for respective positions or states of the optical lens and information related to automatic focusing.

The storage 1150 may store image data sensed through the image sensor 1142. The storage 1150 may be provided outside the image sensing device 1140 and may be stacked with a sensor chip constituting the image sensing device 1140. In an exemplary embodiment, the storage 1150 may be implemented with an EEPROM, but embodiments are not limited thereto.

Referring to FIGS. 16 and 17 together, in an exemplary embodiment, one camera module (e.g., first camera module 1100a) from among a plurality of camera modules 1100a, 1100b, and 1100c may include four sub-pixels that are adjacent to one another and share the same color information in one color pixel (i.e., a tetra cell), and another camera module (e.g., the second camera module 1100b) may include nine sub-pixels that are adjacent to one another and share the same color information in one color pixel (i.e., nona cell). However, embodiments are not limited thereto.

In an exemplary embodiment, the camera modules 1100a, 1100b, and 1100c may each include an actuator 1130. Therefore, the camera modules 1100a, 1100b, and 1100c may include the same or different calibration data 1147 according to the operation of actuators 1130 included therein.

In an exemplary embodiment, one camera module (e.g., the second camera module 1100b) from among the camera modules 1100a, 1100b, and 1100c may be a folded lens type camera module including the prism 1105 and the OPFE 1110 as described above, and the other camera modules (e.g., 1100a and 1100c) may be vertical type camera module without the prism 1105 and the OPFE 1110. However, embodiments are not limited thereto.

In an exemplary embodiment, one camera module (e.g., a third camera module 1100c) from among the camera modules 1100a, 1100b, and 1100c may be a vertical type depth camera that extracts depth information by using an infrared ray (IR), for example. In this case, the AP 4000 may generate a 3D depth image by merging image data provided from such a depth camera with image data provided from another camera module (e.g., the first camera module 1100a or the second camera module 1100b).

In an exemplary embodiment, at least two camera modules (e.g., first camera module 1100a and second camera module 1100b) from among the camera modules 1100a, 1100b, and 1100c may have different field of views (FOVs). In this case, for example, at least two camera modules (e.g., the first camera module 1100a and the second camera module 1100b) from among the camera modules 1100a, 1100b, and 1100c may have different optical lenses, but the present disclosure is not limited thereto. For example, the first camera module 1100a from among the camera modules 1100a, 1100b, and 1100c may have a smaller FOV than the second camera module 1100b and the third camera module 1100c. However, the present disclosure is not limited thereto, and the multi camera module 1100 may further include a camera module having a larger FOV than originally used camera modules 1100a, 1100b, and 1100c.

Furthermore, in some embodiments, the camera modules 1100a, 1100b, and 1100c may be different FOVs from one another. In this case, optical lenses included in the camera modules 1100a, 1100b, and 1100c may also be different from one another, but the present disclosure is not limited thereto.

In some embodiments, the camera modules 1100a, 1100b, and 1100c may be physically separated from one another. In other words, the camera modules 1100a, 1100b, and 1100c do not divide and use the sensing area of one image sensor 1142. Rather, an independent image sensor 1142 may be provided inside each of the camera modules 1100a, 1100b, and 1100c.

The AP 4000 may include a plurality of sub-processors 4100a, 4100b, and 4100c, a decoder 4200, a camera module controller 4300, a memory controller 4400, and an internal memory 4500.

The AP 4000 may be implemented separately from the camera modules 1100a, 1100b, and 1100c. For example, the AP 4000 and the camera modules 1100a, 1100b, and 1100c may be implemented separately from each other as separate semiconductor chips.

Image data generated by the camera module 1100a, 1100b, and 1100c may be respectively provided to corresponding sub-processors 4100a, 4100b, and 4100c through image signal lines ISLa, ISLb, and ISLc separated from one another. For example, image data generated from the first camera module 1100a may be provided to a first sub-processor 4100a through a first image signal line ISLa, image data generated from the second camera module 1100b may be provided to a second sub-processor 4100b through a second image signal line ISLb, and image data generated from the third camera module 1100c may be provided to a third sub-processor 4100c through a third image signal line ISLc. The transmission of image data may be performed by using a camera serial interface based on the MIPI, but embodiments are not limited thereto.

In an exemplary embodiment, one sub-processor may be provided to correspond to a plurality of camera modules. For example, the first sub-processor 4100a and the third sub-processor 4100c may be integrally implemented as a single sub-processor instead of being implemented separate from each other, and image data provided from the first camera module 1100a and the third camera module 1100c may be selected by a selecting element (e.g., a multiplexer) and provided to an integrated sub-image processor.

The decoder 4200 may decode bit streams provided to the sub-processors 4100a, 4100b, and 4100c. Because the decoder 4200 of FIG. 15 may perform a function similar to that of the decoder 510 of FIG. 2, descriptions identical to those already given above may be omitted. Although FIGS. 16 and 17 show that the decoder 4200 and the sub-processors 4100*a*, 4100*b*, and 4100*c* are separate functional units for convenience of explanation, the present disclosure is not limited thereto, and the decoder 4200 may be included in each of the sub-processors 4100*a*, 4100*b*, and 4100*c* according to embodiments. In other words, the decoder 4200 may decode bit streams inside the sub-processors 4100*a*, 4100*b*, and 4100*c*.

The camera module controller 4300 may provide a control signal to each of the camera module 1100*a*, 1100*b*, and 1100*c*. A control signal generated from the camera module controller 1216 may be provided to corresponding camera modules 1100*a*, 1100*b*, and 1100*c* through control signal lines CSLa, CSLb, and CSLc separated from one another.

Any one of the camera modules 1100*a*, 1100*b*, and 1100*c* is designated as a master camera (e.g., 1100*b*) according to image generation information or a mode signal including a zoom signal, and the remaining camera modules (e.g. 1100*a* and 1100*c*) may be designated as slave cameras. This information is included in the control signal and may be provided to the corresponding camera modules 1100*a*, 1100*b*, and 1100*c* through the control signal lines CSLa, CSLb, and CSLc separated from one another.

Under the control of the camera module controller 4300, the camera modules 1100*a*, 1100*b*, and 1100*c* operating as a master and slaves may be changed. For example, when the FOV of the first camera module 1100*a* is wider than the FOV of the second camera module 1100*b* and the zoom factor of the first camera module 1100*a* indicates a lower zoom ratio, the second camera module 1100*b* may operate as the master, and the first camera module 1100*a* may operate as a slave. Conversely, when the zoom factor of the first camera module 1100*a* indicates a higher zoom magnification, the first camera module 1100*a* may operate as the master, and the second camera module 1100*b* may operate as a slave.

In an exemplary embodiment, the control signal provided to the camera module 1100*a*, 1100*b*, and 1100*c* from the camera module controller 4300 may include a sync enable signal. For example, when the second camera module 1100*b* is the master camera, and the first camera module 1100*a* and the third camera module 1100*c* are the slave cameras, the camera module controller 4300 may transmit the sync enable signal to the second camera module 1100*b*. The second camera module 1100*b* to which the sync enable signal is provided generates a sync signal based on the provided sync enable signal and provide the generated sync signal to the first camera module 1100*a* and the third camera module 1100*c* through a sync signal line SSL. The first camera module 1100*b* and the second and third camera modules 1100*a* and 1100*c* may be synchronized with the sync signal and transmit image data to the AP 4000.

The AP 4000 may store encoded image data in the internal memory 4500 or the memory 5000 outside the AP 4000, read an encoded image signal from the internal memory 4500 or the memory 5000, decode the encoded image signal, and display image data generated based on a decoded image signal. The memory controller 4500 may control the internal memory 4500 and the memory 5000 overall, such that image data may be stored or loaded between the internal memory 4500 and the memory 5000.

While the present disclosure has been particularly shown and described with reference to exemplary embodiments thereof, it will be understood by those of ordinary skill in the pertinent art that various changes in form and details may be made therein without departing from the scope and spirit of the inventive concept as set forth in the following claims.

What is claimed is:

1. An image compression method to compress image data generated through a pixel array, the method comprising:
   categorizing image data corresponding to a first color pixel having a plurality of sub-pixels arranged adjacent to each other, and generating first color information for the first color pixel;
   determining a reference value as a criterion for compressing the image data based on a pixel value of at least one of the plurality of sub-pixels; and
   comparing pixel values of each of the plurality of sub-pixels with the reference value, and outputting comparison results.

2. The method of claim 1, wherein the determining of the reference value comprises:
   calculating an average pixel value of pixel values of the plurality of sub-pixels; and determining the average pixel value as the reference value.

3. The method of claim 1, wherein the determining of the reference value comprises determining a pixel value of a first sub-pixel from among the plurality of sub-pixels as the reference value.

4. The method of claim 3, wherein the determining of the pixel value of the first sub-pixel as the reference value comprises:
   sorting the pixel values of the plurality of sub-pixels according to values thereof; and
   determining the pixel value of the first sub-pixel having a median of the pixel values of the plurality of sub-pixels as the reference value.

5. The method of claim 4, wherein the first sub-pixel is a sub-pixel having a smaller pixel value of two medians of sorted pixel values in response to a number of the plurality of sub-pixels being an even number.

6. The method of claim 3, wherein the first sub-pixel is a sub-pixel arranged at a pre-determined position within a pixel cell from among the plurality of sub-pixels.

7. The method of claim 1, wherein the categorizing of the image data into the first color pixel comprises:
   buffering a pixel value of each of sub-pixels located in a first row from among the plurality of sub-pixels; and
   receiving image data corresponding to sub-pixels located in a second row from among the plurality of sub-pixels.

8. The method of claim 1, wherein:
   the plurality of sub-pixels is four in number, and
   the plurality of sub-pixels are arranged in a matrix form in the first color pixel.

9. The method of claim 1, wherein:
   the plurality of sub-pixels is nine in number, and
   the plurality of sub-pixels are arranged in a matrix form in the first color pixel.

10. The method of claim 1, wherein the first color information indicates any one of red, green, or blue.

11. The method of claim 1, wherein the comparing of the pixel value of each of the plurality of sub-pixels comprises:
    calculating a difference between the reference value and a pixel value of each of the plurality of sub-pixels,
    outputting each difference as a comparison result, and
    outputting the reference value.

12. An encoder for compressing image data generated through a pixel array, wherein the encoder is configured to categorize image data corresponding to a plurality of sub-pixels arranged adjacent to each other and generating first color information into a first color pixel; determine a reference value being a criterion for compressing the image data based on a pixel value of each of the plurality of sub-pixels; compare the pixel value of each of the plurality of sub-pixels with the reference value, and output comparison results and the reference value.

13. The encoder of claim 12, wherein the reference value is an average value of pixel values of the plurality of sub-pixels.

14. The encoder of claim 12, wherein:
the first color pixel is arranged in a 2×2 matrix form, and
the reference value is the second smallest pixel value from among pixel values of the plurality of sub-pixels.

15. The encoder of claim 12, wherein:
the first color pixel is arranged in a 3×3 matrix form, and
the reference value is a median from among pixel values of the plurality of sub-pixels.

16. The encoder of claim 12, wherein the reference value is a pixel value of a sub-pixel arranged at a pre-determined position from among the plurality of sub-pixels.

17. A camera module comprising:
an image sensor including a pixel array having a plurality of pixels that are arranged in a matrix form and respectively generate a pixel signal, the image sensor configured to convert light into an electrical signal by using photoelectric conversion elements and output image data; and
an encoder configured to output a bit stream generated by compressing the image data,
wherein the encoder categorizes a plurality of sub-pixels arranged adjacent to each other and generating first color information into a first color pixel, determines a reference value as a criterion for compressing the image data based on a pixel value of each of the plurality of sub-pixels, compares the pixel value of each of the plurality of sub-pixels with the reference value, and outputs comparison results and the reference value.

18. The camera module of claim 17, wherein the reference value is any one of an average value or a median of pixel values of the plurality of sub-pixels.

19. The camera module of claim 17, wherein the reference value is a pixel value of a sub-pixel arranged at a pre-determined position from among the plurality of sub-pixels.

20. The camera module of claim 17, further comprising a memory,
wherein the memory buffers image data corresponding to sub-pixels located in a first row from among the plurality of sub-pixels, and
wherein the encoder receives image data corresponding to sub-pixels located in a second row from among the plurality of sub-pixels and compresses the image data based on a reception result and a buffering result.

* * * * *